United States Patent
Shi et al.

(10) Patent No.: US 11,006,292 B2
(45) Date of Patent: *May 11, 2021

(54) USER EQUIPMENT, BASE STATION, BASE STATION ACCESS METHOD, AND RADIO LINK MONITORING METHOD

(71) Applicant: Huawei Technologies Co., Ltd., Shenzhen (CN)

(72) Inventors: Jie Shi, Shenzhen (CN); Junren Chang, Beijing (CN); Liangliang Zhang, Beijing (CN); Bo Lin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/599,925

(22) Filed: Oct. 11, 2019

(65) Prior Publication Data

US 2020/0045567 A1 Feb. 6, 2020

Related U.S. Application Data

(63) Continuation of application No. 15/346,502, filed on Nov. 8, 2016, now Pat. No. 10,470,061, which is a
(Continued)

(30) Foreign Application Priority Data

May 9, 2014 (WO) ................ PCT/CN2014/077181

(51) Int. Cl.
*H04W 24/04* (2009.01)
*H04W 74/00* (2009.01)
(Continued)

(52) U.S. Cl.
CPC ........... *H04W 24/04* (2013.01); *H04L 5/0032* (2013.01); *H04W 72/0413* (2013.01);
(Continued)

(58) Field of Classification Search
CPC ............... H04W 24/04; H04W 74/004; H04W 72/0446; H04W 72/0413; H04W 74/00; H04L 5/0032
See application file for complete search history.

(56) References Cited

U.S. PATENT DOCUMENTS 10,004,098 B2 * 6/2018 Kim ...................... H04W 36/02
2009/0312022 A1 12/2009 Viorel et al.
(Continued)

FOREIGN PATENT DOCUMENTS

CN 101730257 A 6/2010
CN 101836489 A 9/2010
(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network E-UTRAN); Overall description; Stage 2 (Release 12), 3GPP TS 36.300 V12.1.0, Mar. 2014, 209 pages.
(Continued)

*Primary Examiner* — Phuc H Tran
(74) *Attorney, Agent, or Firm* — Slater Matsil, LLP

(57) ABSTRACT

User equipment, a base station, a base station access method, and a radio link monitoring method are provided, where the user equipment includes: a first receiving module, configured to receive first indication information sent by a first base station, where the first indication information includes a time period required by the user equipment to initially request to access a second base station; a first sending
(Continued)

module, configured to send the random access scrambling code to the second base station; and a first notification module, configured to: if the user equipment fails to access the second base station within the time period, notify the first base station that a secondary cell group failure occurs. In this application, efficiency of accessing the second base station by the user equipment is improved by limiting a time in which the user equipment requests to access the second base station.

20 Claims, 6 Drawing Sheets

Related U.S. Application Data continuation of application No. PCT/CN2014/086458, filed on Sep. 12, 2014.

(51) Int. Cl.
*H04L 5/00* (2006.01)
*H04W 72/04* (2009.01)

(52) U.S. Cl.
CPC ....... *H04W 72/0446* (2013.01); *H04W 74/00* (2013.01); *H04W 74/004* (2013.01)

(56) References Cited

U.S. PATENT DOCUMENTS

| | | | |
|---|---|---|---|
| 2010/0216479 A1 | 8/2010 | Kato et al. | |
| 2011/0143675 A1 | 6/2011 | Damnjanovic et al. | |
| 2013/0188473 A1 | 7/2013 | Dinan | |
| 2014/0198729 A1* | 7/2014 | Bostrom | H04W 74/004 370/328 |
| 2014/0233535 A1* | 8/2014 | Zhao | H04L 5/0053 370/336 |
| 2015/0305010 A1 | 10/2015 | Guan et al. | |
| 2015/0382345 A1 | 12/2015 | Yamada | |
| 2016/0057800 A1* | 2/2016 | Ingale | H04W 76/18 370/216 |
| 2016/0100429 A1* | 4/2016 | Bostrom | H04W 24/10 370/329 |
| 2017/0164281 A1* | 6/2017 | Chiba | H04W 72/0446 |

FOREIGN PATENT DOCUMENTS

| | | |
|---|---|---|
| CN | 101998464 A | 3/2011 |
| CN | 102238754 A | 11/2011 |
| CN | 102548015 A | 7/2012 |
| CN | 102595634 A | 7/2012 |
| CN | 102917469 A | 2/2013 |
| CN | 103477682 A | 12/2013 |
| EP | 3544359 A1 | 9/2019 |
| WO | 2013025152 A1 | 2/2013 |
| WO | 2013107036 A1 | 7/2013 |
| WO | 2014101233 A1 | 7/2014 |

OTHER PUBLICATIONS

"3rd Generation Partnership Project; Technical Specification Group Radio Access Network; Evolved Universal Terrestrial Radio Access (E-UTRA); Medium Access Control (MAC) Protocol Specification (Release 10)," 3GPP TS 36.321 V10.1.0, Mar. 2011, 53 pages.

"3rd Generation Partnership Project; Technical Specification Group Radio Access Network; Evolved Universal Terrestrial Radio Access (E-UTRA); Radio Resource Control (RRC); Protocol Specification (Release 10)," 3GPP TS 36.331 V10.1.0, Mar. 2011, 290 pages.

3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.1.0, Mar. 2014, 356 pages.

3rd Generation Partnership Project; Technical Specification Group Radio Access Network; Evolved Universal Terrestrial Radio Access Network (E-UTRAN); X2 application protocol (X2AP) (Release 12), 3GPP TS 36.423 V12.1.0, Mar. 2014, 144 pages.

Ericsson, St Ericsson, "Random Access Failure Handling on SCell," 3GPP TSG-RAN WG2 #77, Tdoc R2-120482, Dresden, Germany, Feb. 6-10, 2012, 3 pages.

Motorola "HeNB Interference Management," 3GPP TSG-RAN WG1 Meeting #59bis, R1-100184, Valencia, Spain, Jan. 18-22, 2010, 4 pages.

"Issues of Random Access Procedure on SCell," Agenda Item: 7.1.1, Source: ASUSTeK, Document for: Discussion and Decision, 3GPP TSG-RAN WG2 Meeting #74, Barcelona, Spain, R2-112922, May 9-13, 2011, 4 pages.

Intel Corporation, "Challenges in the uplink to support dual connectivity," 3GPP TSG RAN WG2 Meeting #82, R2-131986, Fukuoka, Japan, May 20-25, 2013, 7 pages.

* cited by examiner

USER EQUIPMENT, BASE STATION, BASE STATION ACCESS METHOD, AND RADIO LINK MONITORING METHOD

CROSS-REFERENCE TO RELATED APPLICATIONS

This application is a continuation of U.S. patent application Ser. No. 15/346,502, filed on Nov. 8, 2016, which is a continuation of International Application No. PCT/CN2014/086458, filed on Sep. 12, 2014, which claims priority to International Application No. PCT/CN2014/077181, filed on May 9, 2014. All of the afore-mentioned patent applications are hereby incorporated by reference in their entireties.

TECHNICAL FIELD

The present invention relates to the field of communications technologies, and in particular, to user equipment, a base station, a base station access method, and a radio link monitoring method.

BACKGROUND

With development of a Long Term Evolution (LTE) mobile communications system, to enable an evolved system to provide a higher transmission rate with a shorter transmission delay, the evolved system gradually evolves into a system in which two base stations simultaneously provide services for user equipment (UE). A first base station (MeNB, Macro eNodeB) may split data to the UE by using a primary cell of a second base station (primary second cell, PSCell), or a PSCell may directly obtain data from a core network and transmit the data to the UE. Before the UE communicates with the PSCell, the UE may need to initiate a random access (RA) process to the PSCell, and the UE can communicate with the PSCell only after accessing the PSCell; if a radio link failure (RLF) occurs when the UE initiates the random access process, the UE reports an RLF failure notification to the first base station.

In the prior art, before the UE initiates a random access process, the first base station sends an RLF failure condition to the UE, where the RLF failure condition includes a preset maximum quantity of times the UE sends random access scrambling code in the random access process, and when a quantity of times the UE sends the random access scrambling code is greater than the preset maximum quantity of times, the UE reports an RLF failure to the first base station. The random access process initiated by the UE is classified into two types: a random access process initiated when the UE initially requests to access the PSCell, and a random access process subsequently initiated, after the UE successfully accesses the PSCell, to the PSCell again for another requirement such as obtaining an uplink resource. In the prior art, a same maximum quantity of times is used for the two types of random access processes; however, in actual application, a success rate of a random access process initially initiated by the UE is generally lower than a success rate of a random access process subsequently initiated by the UE. Therefore, if a same maximum quantity of times is used, the success rate of the random access process initially initiated by the UE may be reduced, and eventually, random access initiated to the PSCell by the UE fails, which is unfavorable to data transmission between the UE and the PSCell.

In addition, to ensure that quality of a radio link of the PSCell meets a data transmission requirement, the UE needs to perform radio link monitoring on the radio link of the PSCell; however, a condition for triggering the radio link monitoring is not specified in the prior art, so that the UE cannot control a time for enabling the radio link monitoring, and an essential function of the radio link monitoring cannot be implemented.

SUMMARY

Embodiments of the present invention provide user equipment, a base station, a base station access method, and a radio link monitoring method, so that efficiency of accessing a second base station by the user equipment is improved by limiting a time in which the user equipment requests to access the second base station or a quantity of times of sending random access scrambling code in initial and subsequent access.

A first aspect of the embodiments of the present invention provides user equipment, including a first receiving module configured to receive first indication information sent by a first base station, where the first indication information includes a time period required by the user equipment to initially request to access a second base station, or includes a preset first maximum quantity of times the user equipment sends random access scrambling code to the second base station when the user equipment initially requests to access the second base station. A first sending module is configured to send the random access scrambling code to the second base station. A first notification module is configured to: if the user equipment fails to access the second base station within the time period according to the first indication information, or if a quantity of times the user equipment sends the random access scrambling code to the second base station when the user equipment initially requests to access the second base station is greater than the first maximum quantity of times according to the first indication information, notify the first base station that the user equipment encounters a second base station cell group failure.

With reference to an implementation manner of the first aspect of the embodiments of the present invention, in a first possible implementation manner of the first aspect of the embodiments of the present invention, the equipment further includes a first transmission module configured to perform data transmission with the first base station and the second base station in a dual connectivity manner if the user equipment accesses the second base station.

With reference to an implementation manner of the first aspect of the embodiments of the present invention, in a second possible implementation manner of the first aspect of the embodiments of the present invention, the first indication information is set by the second base station, and is sent to the first receiving module by using non-mobility information in a radio resource control reconfiguration message of the first base station.

With reference to an implementation manner of the first aspect of the embodiments of the present invention, in a third possible implementation manner of the first aspect of the embodiments of the present invention, the first indication information is set by the second base station, and is sent to the first receiving module by using configuration information, related to a secondary cell group, in a radio resource control reconfiguration message of the first base station.

With reference to the first aspect of the embodiments of the present invention, or either the second or the third possible implementation manner of the first aspect, in a fourth possible implementation manner of the first aspect of the embodiments of the present invention, the first receiving module obtains the first indication information from second-base-station adding information or dual connectivity establishment information, where the second-base-station adding information or the dual connectivity establishment information is sent by the first base station.

With reference to an implementation manner of the first aspect of the embodiments of the present invention, in a fifth possible implementation manner of the first aspect of the embodiments of the present invention, if the first indication information includes the time period required by the user equipment to initially request to access the second base station, the first sending module includes a first starting unit is configured to start a timer when the first sending module initially sends the random access scrambling code to the second base station, or when the first sending module initially decides to send the random access scrambling code to the second base station, where a timing time of the timer is the time period in the first indication information. A sending unit is configured to continually send the random access scrambling code to the second base station within the timing time.

With reference to an implementation manner of the first aspect of the embodiments of the present invention, in a sixth possible implementation manner of the first aspect of the embodiments of the present invention, if the first indication information includes the time period required by the user equipment to initially request to access the second base station, the first starting unit is further configured to start the timer when the first receiving module receives the first indication information sent by the first base station.

With reference to an implementation manner of the first aspect of the embodiments of the present invention, in a seventh possible implementation manner of the first aspect of the embodiments of the present invention, the second base station cell group failure notified by the first notification module is a failure in initially requesting to access the second base station or a failure in requesting to access the second base station.

With reference to the seventh possible implementation manner of the first aspect of the embodiments of the present invention, in an eighth possible implementation manner of the first aspect of the embodiments of the present invention, the second base station cell group failure includes information that indicates timer expiry.

With reference to the first aspect of the embodiments of the present invention, or either the fifth or the sixth possible implementation manner of the first aspect, in a ninth possible implementation manner of the first aspect of the embodiments of the present invention, the equipment further includes a stopping module configured to stop the timer if the user equipment accesses the second base station within the timing time of the timer.

With reference to an implementation manner of the first aspect of the embodiments of the present invention, in a tenth possible implementation manner of the first aspect of the embodiments of the present invention, the first indication information further includes a preset second maximum quantity of times the first sending module sends the random access scrambling code to the second base station after the user equipment accesses the second base station; and when a quantity of times the first sending module sends the random access scrambling code in a process in which the user equipment requests to access the second base station is greater than the second maximum quantity of times, the second maximum quantity of times is used by the first notification module to notify, by using an upper layer of the user equipment, the first base station that the user equipment fails to request to access the second base station.

With reference to an implementation manner of the first aspect of the embodiments of the present invention, in an eleventh possible implementation manner of the first aspect of the embodiments of the present invention, the first receiving module is further configured to: if the user equipment accesses the second base station, receive second indication information sent by the first base station, where the second indication information includes a second maximum quantity of times the first sending module sends the random access scrambling code to the second base station.

With reference to any one of the first aspect of the embodiments of the present invention to the eleventh possible implementation manner of the first aspect, in a twelfth possible implementation manner of the first aspect of the embodiments of the present invention, the user equipment requests to access a cell of the second base station or a primary secondary cell.

A second aspect of the embodiments of the present invention provides user equipment, including: a first input apparatus, a first output apparatus, a first memory, and a first processor. The first memory is configured to store a program, and the first processor is configured to invoke the program to perform the following steps of receiving, by using the first input apparatus, first indication information sent by a first base station, where the first indication information includes a time period required by the user equipment to initially request to access a second base station, or includes a preset first maximum quantity of times the user equipment sends random access scrambling code to the second base station when the user equipment initially requests to access the second base station; sending the random access scrambling code to the second base station by using the first output apparatus. If the user equipment fails to access the second base station within the time period according to the first indication information, or if a quantity of times the user equipment sends the random access scrambling code to the second base station when the user equipment initially requests to access the second base station is greater than the first maximum quantity of times according to the first indication information, notifying, by using the first output apparatus, the first base station that the user equipment encounters a second base station cell group failure.

With reference to an implementation manner of the second aspect of the embodiments of the present invention, in a first possible implementation manner of the second aspect of the embodiments of the present invention, the first processor further performs the following step of performing data transmission with the first base station and the second base station in a dual connectivity manner if the user equipment accesses the second base station.

With reference to an implementation manner of the second aspect of the embodiments of the present invention, in a second possible implementation manner of the second aspect of the embodiments of the present invention, the first indication information is set by the second base station, and is sent to the first input apparatus by using non-mobility information in a radio resource control reconfiguration message of the first base station.

With reference to an implementation manner of the second aspect of the embodiments of the present invention, in a third possible implementation manner of the second aspect of the embodiments of the present invention, the first indication information is set by the second base station, and is sent to the first input apparatus by using configuration information, related to a secondary cell group, in a radio resource control reconfiguration message of the first base station.

With reference to the second aspect of the embodiments of the present invention, or either the second or the third possible implementation manner of the second aspect, in a fourth possible implementation manner of the secondaspect of the embodiments of the present invention, the first processor obtains the first indication information from second-base-station adding information or dual connectivity establishment information, where the second-base-station adding information or the dual connectivity establishment information is sent by the first base station.

With reference to an implementation manner of the second aspect of the embodiments of the present invention, in a fifth possible implementation manner of the second aspect of the embodiments of the present invention, if the first indication information includes the time period required by the user equipment to initially request to access the second base station, the first processor sends the random access scrambling code to the second base station, and performs the following steps of starting a timer when the first processor initially sends the random access scrambling code to the second base station, or when the first processor initially decides to send the random access scrambling code to the second base station, where a timing time of the timer is the time period in the first indication information; and continually sending the random access scrambling code to the second base station within the timing time.

With reference to an implementation manner of the second aspect of the embodiments of the present invention, in a sixth possible implementation manner of the second aspect of the embodiments of the present invention, if the first indication information includes the time period required by the user equipment to initially request to access the second base station, the first processor receives the first indication information sent by the first base station, and performs the following step of starting the timer when the first receiving module receives the first indication information sent by the first base station.

With reference to an implementation manner of the second aspect of the embodiments of the present invention, in a seventh possible implementation manner of the second aspect of the embodiments of the present invention, the second base station cell group failure notified by the first processor is a failure in initially requesting to access the second base station or a failure in requesting to access the second base station.

With reference to the seventh possible implementation manner of the second aspect of the embodiments of the present invention, in an eighth possible implementation manner of the second aspect of the embodiments of the present invention, the second base station cell group failure includes information that indicates timer expiry.

With reference to the second aspect of the embodiments of the present invention, or either the fifth or the sixth possible implementation manner of the second aspect, in a ninth possible implementation manner of the second aspect of the embodiments of the present invention, the first processor further performs the following step of stopping the timer if the user equipment accesses the second base station within the timing time of the timer.

With reference to an implementation manner of the second aspect of the embodiments of the present invention, in a tenth possible implementation manner of the second aspect of the embodiments of the present invention, the first indication information further includes a preset second maximum quantity of times the first processor sends the random access scrambling code to the second base station after the first processor accesses the second base station; and when a quantity of times the first processor sends the random access scrambling code in a process of requesting to access the second base station is greater than the second maximum quantity of times, the second maximum quantity of times is used by the first processor to notify, by using an upper layer of the user equipment, the first base station that the user equipment fails to request to access the second base station.

With reference to an implementation manner of the second aspect of the embodiments of the present invention, in an eleventh possible implementation manner of the second aspect of the embodiments of the present invention, the first processor further performs the following step. If the user equipment accesses the second base station, receiving second indication information sent by the first base station, where the second indication information includes a second maximum quantity of times the first processor sends the random access scrambling code to the second base station.

With reference to any one of the second aspect of the embodiments of the present invention to the eleventh possible implementation manner of the second aspect, in a twelfth possible implementation manner of the second aspect of the embodiments of the present invention, the first processor requests to access a cell of the second base station or a primary secondary cell.

A third aspect of the embodiments of the present invention provides a base station, including a sending module configured to send first indication information to user equipment, where the first indication information includes a time period required by the user equipment to initially request to access a second base station, or includes a preset first maximum quantity of times the user equipment sends random access scrambling code to the second base station when the user equipment initially requests to access the second base station. A receiving module is configured to: if the user equipment fails to request to access the second base station within the time period according to the first indication information, or if a quantity of times the user equipment sends the random access scrambling code to the second base station when the user equipment initially requests to access the second base station is greater than the first maximum quantity of times according to the first indication information, receive a second base station cell group failure notification sent by the user equipment.

With reference to an implementation manner of the third aspect of the embodiments of the present invention, in a first possible implementation manner of the third aspect of the embodiments of the present invention, the first indication information is set by the second base station, and is sent to the user equipment by using non-mobility information in a radio resource control reconfiguration message of the sending module.

With reference to an implementation manner of the third aspect of the embodiments of the present invention, in a second possible implementation manner of the third aspect of the embodiments of the present invention, the first indication information is set by the second base station, and is sent to the user equipment by using configuration information, related to a secondary cell group, in a radio resource control reconfiguration message of the sending module.

With reference to an implementation manner of the third aspect of the embodiments of the present invention, in a third possible implementation manner of the third aspect of the embodiments of the present invention, a second base station cell group failure notified by the user equipment is a failure in initially requesting to access the second base station or a failure in requesting to access the second base station.

With reference to the third possible implementation manner of the third aspect of the embodiments of the present invention, in a fourth possible implementation manner of the third aspect of the embodiments of the present invention, the second base station cell group failure includes information that indicates timer expiry.

With reference to an implementation manner of the third aspect of the embodiments of the present invention, in a fifth possible implementation manner of the third aspect of the embodiments of the present invention, the first indication information further includes a preset second maximum quantity of times the user equipment sends the random access scrambling code to the second base station after the user equipment accesses the second base station; and when a quantity of times the user equipment sends the random access scrambling code in a process of requesting to access the second base station is greater than the second maximum quantity of times, the second maximum quantity of times is used by the receiving module to receive a second base station cell group failure notified by the user equipment by using an upper layer of the user equipment.

With reference to an implementation manner of the third aspect of the embodiments of the present invention, in a sixth possible implementation manner of the third aspect of the embodiments of the present invention, the sending module is further configured to send second indication information to the user equipment if the user equipment accesses the second base station, where the second indication information includes a second maximum quantity of times the user equipment sends the random access scrambling code to the second base station.

A fourth aspect of the embodiments of the present invention provides a base station, and the base station includes an input apparatus, an output apparatus, a memory, and a processor. The memory is configured to store a program, and the processor is configured to invoke the program to perform the following steps of sending first indication information to user equipment by using the output apparatus, where the first indication information includes a time period required by the user equipment to initially request to access a second base station, or includes a preset first maximum quantity of times the user equipment sends random access scrambling code to the second base station when the user equipment initially requests to access the second base station. If the user equipment fails to request to access the second base station within the time period according to the first indication information, or if a quantity of times the user equipment sends the random access scrambling code to the second base station when the user equipment initially requests to access the second base station is greater than the first maximum quantity of times according to the first indication information, receiving, by using the input apparatus, a second base station cell group failure notification sent by the user equipment. With reference to an implementation manner of the fourth aspect of the embodiments of the present invention, in a first possible implementation manner of the fourth aspect of the embodiments of the present invention, the first indication information is set by the second base station, and is sent to the user equipment by using non-mobility information in a radio resource control reconfiguration message of the output apparatus.

With reference to an implementation manner of the fourth aspect of the embodiments of the present invention, in a second possible implementation manner of the fourth aspect of the embodiments of the present invention, the first indication information is set by the second base station, and is sent to the user equipment by using configuration information, related to a secondary cell group, in a radio resource control reconfiguration message of the output apparatus.

With reference to an implementation manner of the fourth aspect of the embodiments of the present invention, in a third possible implementation manner of the fourth aspect of the embodiments of the present invention, a second base station cell group failure notified by the user equipment is a failure in initially requesting to access the second base station or a failure in requesting to access the second base station.

With reference to the third possible implementation manner of the fourth aspect of the embodiments of the present invention, in a fourth possible implementation manner of the fourth aspect of the embodiments of the present invention, the second base station cell group failure includes information that indicates timer expiry.

With reference to an implementation manner of the fourth aspect of the embodiments of the present invention, in a fifth possible implementation manner of the fourth aspect of the embodiments of the present invention, the first indication information further includes a preset second maximum quantity of times the user equipment sends the random access scrambling code to the second base station after the user equipment accesses the second base station; and when a quantity of times the user equipment sends the random access scrambling code in a process of requesting to access the second base station is greater than the second maximum quantity of times, the second maximum quantity of times is used by the input apparatus to receive a second base station cell group failure notified by the user equipment by using an upper layer of the user equipment.

With reference to an implementation manner of the fourth aspect of the embodiments of the present invention, in a sixth possible implementation manner of the fourth aspect of the embodiments of the present invention, the processor further performs the following step: sending, by the output apparatus, second indication information to the user equipment if the user equipment accesses the second base station, where the second indication information includes a second maximum quantity of times the user equipment sends the random access scrambling code to the second base station.

A fifth aspect of the embodiments of the present invention provides user equipment, including a second receiving module is configured to receive second indication information sent by a first base station, where the second indication information includes a parameter of radio link monitoring performed on a radio link of a primary secondary cell. An enabling module is configured to enable the radio link monitoring according to a triggering condition, where the condition for triggering the radio link monitoring includes at least one of the following. When the second receiving module receives the parameter, sent by the first base station, of the radio link monitoring performed on the radio link of the primary secondary cell. Alternatively, when the user equipment accesses the primary secondary cell. Alternatively, when a second sending module of the user equipment sends the random access scrambling code to the primary secondary cell.

With reference to an implementation manner of the fifth aspect of the embodiments of the present invention, in a first possible implementation manner of the fifth aspect of the embodiments of the present invention, the radio link monitoring of the enabling module includes at least one of the following two units: a counting unit configured to perform synchronized counting and/or unsynchronized counting according to the triggering condition, a timer starting unit configured to start an unsynchronization timer.

With reference to the first possible implementation manner of the fifth aspect of the embodiments of the present invention, in a second possible implementation manner of the fifth aspect of the embodiments of the present invention, a condition for the timer starting unit to start the unsynchronization timer includes the triggering condition is met, and a value accumulated by the counting unit according to the unsynchronized counting is greater than or equal to a first preset value.

With reference to an implementation manner of the fifth aspect of the embodiments of the present invention, in a third possible implementation manner of the fifth aspect of the embodiments of the present invention, when the second receiving module receives the parameter sent by the first base station, the primary secondary cell is a serving cell that is of the second base station and that has provided a service for the UE.

With reference to an implementation manner of the fifth aspect of the embodiments of the present invention, in a fourth possible implementation manner of the fifth aspect of the embodiments of the present invention, the equipment further includes a second notification module configured to: if a radio link failure occurs when the user equipment performs the radio link monitoring, notify the first base station that the user equipment encounters a second base station cell group failure.

With reference to an implementation manner of the fifth aspect of the embodiments of the present invention, in a fifth possible implementation manner of the fifth aspect of the embodiments of the present invention, the second indication information is set by the second base station, and is sent to the second receiving module by using non-mobility information in a radio resource control reconfiguration message of the first base station.

With reference to an implementation manner of the fifth aspect of the embodiments of the present invention, in a sixth possible implementation manner of the fifth aspect of the embodiments of the present invention, the second indication information is set by the second base station, and is sent to the second receiving module by using configuration information, related to a secondary cell group, in a radio resource control reconfiguration message of the first base station.

With reference to the fifth aspect of the embodiments of the present invention, or either the fifth or the sixth possible implementation manner of the fifth aspect, in a seventh possible implementation manner of the fifth aspect of the embodiments of the present invention, the second receiving module obtains the second indication information from primary secondary cell adding information or dual connectivity establishment information sent by the first base station.

With reference to the fourth possible implementation manner of the fifth aspect of the embodiments of the present invention, in an eighth possible implementation manner of the fifth aspect of the embodiments of the present invention, a condition for the radio link failure to occur when the user equipment performs the radio link monitoring is unsynchronization timer expiry.

With reference to an implementation manner of the fifth aspect of the embodiments of the present invention, in a ninth possible implementation manner of the fifth aspect of the embodiments of the present invention, the user equipment accesses the primary secondary cell in any one of the following manners. A random access process is initiated by the user equipment to the primary secondary cell is successfully completed. Alternatively, the user equipment accesses the primary secondary cell within a maximum quantity of times the second sending module sends the random access scrambling code. Alternatively, the user equipment accesses the primary secondary cell within a time period required for initially requesting to access the primary secondary cell. Alternatively, when a second transmission module of the user equipment begins to perform data transmission with the primary secondary cell.

A sixth aspect of the embodiments of the present invention provides user equipment, and the user equipment includes: a second input apparatus, a second output apparatus, a second memory, and a second processor. The second memory is configured to store a program, and the second processor is configured to invoke the program to perform the following steps including receiving, by using the second input apparatus, second indication information sent by a first base station, where the second indication information includes a parameter of radio link monitoring performed on a radio link of a primary secondary cell. The radio link monitoring according to a triggering condition is enabled, where the condition for triggering the radio link monitoring includes at least one of the following. When the parameter, sent by the first base station, of the radio link monitoring performed on the radio link of the primary secondary cell is received by using the second input apparatus; or when the primary secondary cell is accessed; or when the random access scrambling code is sent to the primary secondary cell by using the second output apparatus.

With reference to an implementation manner of the sixth aspect of the embodiments of the present invention, in a first possible implementation manner of the sixth aspect of the embodiments of the present invention, the second processor further performs at least one of the following steps of performing synchronized counting and/or unsynchronized counting according to the triggering condition; and starting an unsynchronization timer.

With reference to the first possible implementation manner of the sixth aspect of the embodiments of the present invention, in a second possible implementation manner of the sixth aspect of the embodiments of the present invention, a condition for the second processor to start the unsynchronization timer includes:

the triggering condition is met, and a value accumulated according to the unsynchronized counting is greater than or equal to a first preset value.

With reference to an implementation manner of the sixth aspect of the embodiments of the present invention, in a third possible implementation manner of the sixth aspect of the embodiments of the present invention, when the parameter sent by the first base station is received by using the second input apparatus, the primary secondary cell is a serving cell that is of the second base station and that has provided a service for the UE.

With reference to an implementation manner of the sixth aspect of the embodiments of the present invention, in a fourth possible implementation manner of the sixth aspect of the embodiments of the present invention, the second processor further performs the following step: if a radio link failure occurs during the radio link monitoring, notifying, by using the second output apparatus, the first base station that the user equipment encounters a second base station cell group failure.

With reference to an implementation manner of the sixth aspect of the embodiments of the present invention, in a fifth possible implementation manner of the sixth aspect of the embodiments of the present invention, the second indication information is set by the second base station, and is sent to the second input apparatus by using non-mobility information in a radio resource control reconfiguration message of the first base station.

With reference to an implementation manner of the sixth aspect of the embodiments of the present invention, in a sixth possible implementation manner of the sixth aspect of the embodiments of the present invention, the second indication information is set by the second base station, and is sent to the second input apparatus by using configuration information, related to a secondary cell group, in a radio resource control reconfiguration message of the first base station.

With reference to the sixth aspect of the embodiments of the present invention, or either the fifth or the sixth possible implementation manner of the sixth aspect, in a seventh possible implementation manner of the sixth aspect of the embodiments of the present invention, the second input apparatus obtains the second indication information from primary secondary cell adding information or dual connectivity establishment information sent by the first base station.

With reference to the fourth possible implementation manner of the sixth aspect of the embodiments of the present invention, in an eighth possible implementation manner of the sixth aspect of the embodiments of the present invention, a condition for the radio link failure to occur when the user equipment performs the radio link monitoring is unsynchronization timer expiry.

With reference to an implementation manner of the sixth aspect of the embodiments of the present invention, in a ninth possible implementation manner of the sixth aspect of the embodiments of the present invention, the second processor accesses the primary secondary cell in any one of the following manners. A random access process is initiated by the second processor to the primary secondary cell is successfully completed. Alternatively, the second processor accesses the primary secondary cell within a maximum quantity of times of sending the random access scrambling code by using the second output apparatus. Alternatively, the second processor accesses the primary secondary cell within a time period required for initially requesting to access the primary secondary cell. Alternatively, when the second processor begins to perform data transmission with the primary secondary cell by using the second output apparatus.

A seventh aspect of the embodiments of the present invention provides a base station access method, including receiving, by user equipment, first indication information sent by a first base station, where the first indication information includes a time period required by the user equipment to initially request to access a second base station, or includes a preset first maximum quantity of times the user equipment sends random access scrambling code to the second base station when the user equipment initially requests to access the second base station; sending, by the user equipment, the random access scrambling code to the second base station. If the user equipment fails to access the second base station within the time period according to the first indication information, or if a quantity of times the user equipment sends the random access scrambling code to the second base station when the user equipment initially requests to access the second base station is greater than the first maximum quantity of times according to the first indication information, notifying, by the user equipment, the first base station that the user equipment encounters a second base station cell group failure.

With reference to an implementation manner of the seventh aspect of the embodiments of the present invention, in a first possible implementation manner of the seventh aspect of the embodiments of the present invention, the method further includes performing, by the user equipment, data transmission with the first base station and the second base station in a dual connectivity manner if the user equipment accesses the second base station.

With reference to an implementation manner of the seventh aspect of the embodiments of the present invention, in a second possible implementation manner of the seventh aspect of the embodiments of the present invention, the first indication information is set by the second base station, and is sent to the user equipment by using non-mobility information in a radio resource control reconfiguration message of the first base station.

With reference to an implementation manner of the seventh aspect of the embodiments of the present invention, in a third possible implementation manner of the seventh aspect of the embodiments of the present invention, the first indication information is set by the second base station, and is sent to the user equipment by using configuration information, related to a secondary cell group, in a radio resource control reconfiguration message of the first base station.

With reference to the seventh aspect of the embodiments of the present invention, or either the second or the third possible implementation manner of the seventh aspect, in a fourth possible implementation manner of the seventh aspect of the embodiments of the present invention, the user equipment obtains the first indication information from second-base-station adding information or dual connectivity establishment information, where the second-base-station adding information or the dual connectivity establishment information is sent by the first base station.

With reference to an implementation manner of the seventh aspect of the embodiments of the present invention, in a fifth possible implementation manner of the seventh aspect of the embodiments of the present invention, if the first indication information includes the time period required by the user equipment to initially request to access the second base station, the sending, by the user equipment, the random access scrambling code to the second base station specifically includes starting, by the user equipment, a timer when the user equipment initially sends the random access scrambling code to the second base station, or when the user equipment initially decides to send the random access scrambling code to the second base station. A timing time of the timer is the time period in the first indication information. The steps further comprise continually sending, by the user equipment, the random access scrambling code to the second base station within the timing time.

With reference to an implementation manner of the seventh aspect of the embodiments of the present invention, in a sixth possible implementation manner of the seventh aspect of the embodiments of the present invention, if the first indication information includes the time period required by the user equipment to initially request to access the second base station, the receiving, by user equipment, first indication information sent by a first base station specifically includes:

starting, by the user equipment, the timer when the user equipment receives the first indication information sent by the first base station.

With reference to an implementation manner of the seventh aspect of the embodiments of the present invention, in a seventh possible implementation manner of the seventh aspect of the embodiments of the present invention, the second base station cell group failure notified by the user equipment is a failure in initially requesting to access the second base station or a failure in requesting to access the second base station.

With reference to the seventh possible implementation manner of the seventh aspect of the embodiments of the present invention, in an eighth possible implementation manner of the seventh aspect of the embodiments of the present invention, the second base station cell group failure includes information that indicates timer expiry.

With reference to the seventh aspect of the embodiments of the present invention, or either the fifth or the sixth possible implementation manner of the seventh aspect, in a ninth possible implementation manner of the seventh aspect of the embodiments of the present invention, the user equipment stops the timer if the user equipment accesses the second base station within the timing time of the timer.

With reference to an implementation manner of the seventh aspect of the embodiments of the present invention, in a tenth possible implementation manner of the seventh aspect of the embodiments of the present invention, the first indication information further includes a preset second maximum quantity of times the user equipment sends the random access scrambling code to the second base station after the user equipment accesses the second base station; and when a quantity of times the user equipment sends the random access scrambling code in a process of requesting to access the second base station is greater than the second maximum quantity of times, the second maximum quantity of times is used by the user equipment to notify, by using an upper layer of the user equipment, the first base station that the user equipment fails to request to access the second base station.

With reference to an implementation manner of the seventh aspect of the embodiments of the present invention, in an eleventh possible implementation manner of the seventh aspect of the embodiments of the present invention, the method further includes receiving, by the user equipment, second indication information sent by the first base station if the user equipment accesses the second base station. The second indication information includes a second maximum quantity of times the user equipment sends the random access scrambling code to the second base station.

With reference to any one of the seventh aspect of the embodiments of the present invention to the eleventh possible implementation manner of the seventh aspect, in a twelfth possible implementation manner of the seventh aspect of the embodiments of the present invention, the user equipment requests to access a cell of the second base station or a primary secondary cell.

An eighth aspect of the embodiments of the present invention provides a computer storage medium, where the computer storage medium may store a program, and when the program runs, a step in any one of the seventh aspect to the twelfth possible implementation manner of the seventh aspect in claims is performed.

A ninth aspect of the embodiments of the present invention provides a base station access method, including sending, by a first base station, first indication information to user equipment, where the first indication information includes a time period required by the user equipment to initially request to access a second base station, or includes a preset first maximum quantity of times the user equipment sends random access scrambling code to the second base station when the user equipment initially requests to access the second base station. If the user equipment fails to request to access the second base station within the time period according to the first indication information, or if a quantity of times the user equipment sends the random access scrambling code to the second base station when the user equipment initially requests to access the second base station is greater than the first maximum quantity of times according to the first indication information, receiving, by the first base station, a second base station cell group failure notification sent by the user equipment.

With reference to an implementation manner of the ninth aspect of the embodiments of the present invention, in a first possible implementation manner of the ninth aspect of the embodiments of the present invention, the first indication information is set by the second base station, and is sent to the user equipment by using non-mobility information in a radio resource control reconfiguration message of the first base station.

With reference to an implementation manner of the ninth aspect of the embodiments of the present invention, in a second possible implementation manner of the ninth aspect of the embodiments of the present invention, the first indication information is set by the second base station, and is sent to the user equipment by using configuration information, related to a secondary cell group, in a radio resource control reconfiguration message of the first base station.

With reference to an implementation manner of the ninth aspect of the embodiments of the present invention, in a third possible implementation manner of the ninth aspect of the embodiments of the present invention, a second base station cell group failure notified by the user equipment is a failure in initially requesting to access the second base station or a failure in requesting to access the second base station.

With reference to the third possible implementation manner of the ninth aspect of the embodiments of the present invention, in a fourth possible implementation manner of the ninth aspect of the embodiments of the present invention, the second base station cell group failure includes information that indicates timer expiry.

With reference to an implementation manner of the ninth aspect of the embodiments of the present invention, in a fifth possible implementation manner of the ninth aspect of the embodiments of the present invention, the first indication information further includes a preset second maximum quantity of times the user equipment sends the random access scrambling code to the second base station after the user equipment accesses the second base station; and when a quantity of times the user equipment sends the random access scrambling code in a process of requesting to access the second base station is greater than the second maximum quantity of times, the second maximum quantity of times is used by the first base station to receive a second base station cell group failure notified by the user equipment by using an upper layer of the user equipment.

With reference to an implementation manner of the ninth aspect of the embodiments of the present invention, in a sixth possible implementation manner of the ninth aspect of the embodiments of the present invention, the first base station sends second indication information to the user equipment if the user equipment accesses the second base station, where the second indication information includes a second maximum quantity of times the user equipment sends the random access scrambling code to the second base station.

A tenth aspect of the embodiments of the present invention provides a computer storage medium, where the computer storage medium may store a program, and when the program runs, a step in any one of the ninth aspect to the sixth possible implementation manner of the ninth aspect in claims is performed.

An eleventh aspect of the embodiments of the present invention provides a radio link monitoring method, including receiving, by user equipment, second indication information sent by a first base station, where the second indication information includes a parameter of radio link monitoring performed on a radio link of a primary secondary cell; and enabling, by the user equipment, the radio link monitoring according to a triggering condition, where the condition for triggering the radio link monitoring includes at least one of the following. When the user equipment receives the parameter, sent by the first base station, of the radio link monitoring performed on the radio link of the primary secondary cell. Alternatively, when the user equipment accesses the primary secondary cell, or when the user equipment sends the random access scrambling code to the primary secondary cell.

With reference to an implementation manner of the eleventh aspect of the embodiments of the present invention, in a first possible implementation manner of the eleventh aspect of the embodiments of the present invention, the enabling, by the user equipment, the radio link monitoring according to a triggering condition specifically includes performing synchronized counting and/or unsynchronized counting according to the triggering condition; and starting an unsynchronization timer.

With reference to the first possible implementation manner of the eleventh aspect of the embodiments of the present invention, in a second possible implementation manner of the eleventh aspect of the embodiments of the present invention, a condition for starting the unsynchronization timer includes:

the triggering condition is met, and a value accumulated according to the unsynchronized counting is greater than or equal to a first preset value.

With reference to an implementation manner of the eleventh aspect of the embodiments of the present invention, in a third possible implementation manner of the eleventh aspect of the embodiments of the present invention, when the user equipment receives the parameter sent by the first base station, the primary secondary cell is a serving cell that is of the second base station and that has provided a service for the UE.

With reference to an implementation manner of the eleventh aspect of the embodiments of the present invention, in a fourth possible implementation manner of the eleventh aspect of the embodiments of the present invention, if a radio link failure occurs when the user equipment performs the radio link monitoring, the user equipment notifies the first base station that the user equipment encounters a second base station cell group failure.

With reference to an implementation manner of the eleventh aspect of the embodiments of the present invention, in a fifth possible implementation manner of the eleventh aspect of the embodiments of the present invention, the second indication information is set by the second base station, and is sent to the user equipment by using non-mobility information in a radio resource control reconfiguration message of the first base station.

With reference to an implementation manner of the eleventh aspect of the embodiments of the present invention, in a sixth possible implementation manner of the eleventh aspect of the embodiments of the present invention, the second indication information is set by the second base station, and is sent to the user equipment by using configuration information, related to a secondary cell group, in a radio resource control reconfiguration message of the first base station.

With reference to the eleventh aspect of the embodiments of the present invention, or either the fifth or the sixth possible implementation manner of the eleventh aspect, in a seventh possible implementation manner of the eleventh aspect of the embodiments of the present invention, the user equipment obtains the second indication information from primary secondary cell adding information or dual connectivity establishment information sent by the first base station.

With reference to the fourth possible implementation manner of the eleventh aspect of the embodiments of the present invention, in an eighth possible implementation manner of the eleventh aspect of the embodiments of the present invention, a condition for the radio link failure to occur when the user equipment performs the radio link monitoring is unsynchronization timer expiry.

With reference to the sixth possible implementation manner of the eleventh aspect of the embodiments of the present invention, in a ninth possible implementation manner of the eleventh aspect of the embodiments of the present invention, the user equipment accesses the primary secondary cell in any one of the following manners:

a random access process initiated by the user equipment to the primary secondary cell is successfully completed; or the user equipment accesses the primary secondary cell within a preset maximum quantity of times of sending the random access scrambling code; or the user equipment accesses the primary secondary cell within a time period required for initially requesting to access the primary secondary cell; or when the user equipment begins to perform data transmission with the primary secondary cell.

A twelfth aspect of the embodiments of the present invention provides a computer storage medium, where the computer storage medium may store a program, and when the program runs, a step in any one of the eleventh aspect to the ninth possible implementation manner of the eleventh aspect in claims is performed.

According to the embodiments of the present invention, a time in which user equipment initiates a random access process or a quantity of times user equipment sends random access scrambling code can be limited by using a primary secondary cell. Therefore, a success rate of accessing the primary secondary cell by the user equipment is improved, and the user equipment can access the primary secondary cell faster. In addition, respective maximum quantities of times the user equipment initially initiates a random access process and continues to initiate a random access process after accessing the primary secondary cell are differentiated, so that efficiency of accessing the primary secondary cell by the user equipment can be improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

According to the embodiments of the present invention, efficiency of accessing a second base station by user equipment is improved by limiting a time in which the user equipment requests to access the second base station or a quantity of times of sending random access scrambling code in initial and subsequent access.

Figure 1:
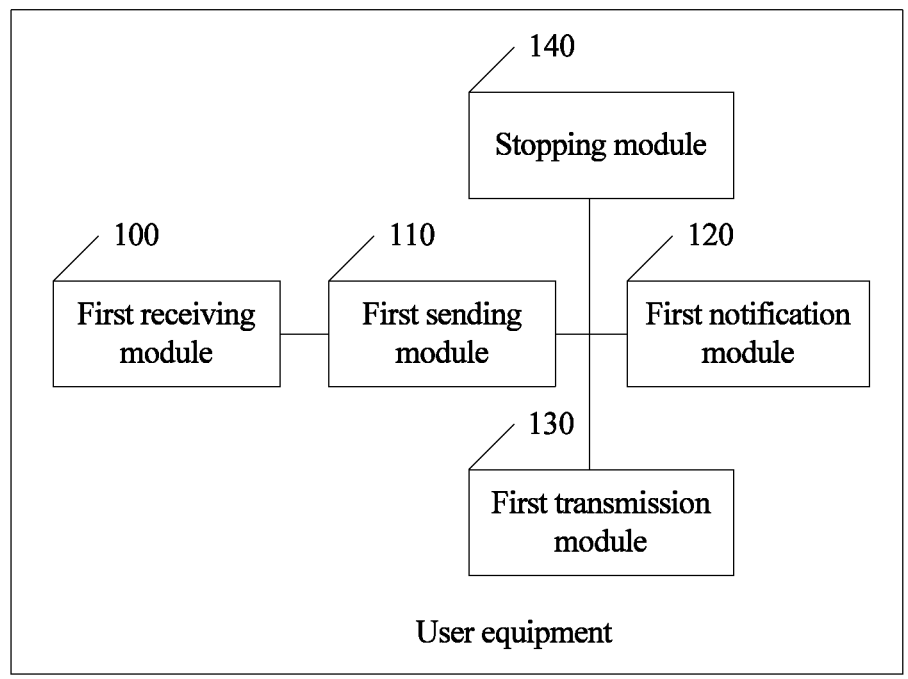
FIG. 1 is a schematic structural diagram of an embodiment of user equipment according to an embodiment of the present invention.

FIG. 1 is a schematic structural diagram of an embodiment of user equipment according to an embodiment of the present invention. A second base station involved in this embodiment of the present invention may be a primary secondary cell PSCell. An involved process of requesting to access the second base station may be a random access process. All information, such as a parameter and indication information, obtained by the UE from a first base station is set by the second base station, transmitted to the first base station by using an X2 interface of the second base station, and then sent to the UE by the first base station.

The user equipment involved in this embodiment of the present invention includes a first receiving module 100, a first sending module 110, and a first notification module 120.

The first receiving module 100 is configured to receive first indication information sent by a first base station, where the first indication information includes a time period required by the user equipment to initially request to access a second base station, or includes a preset first maximum quantity of times the user equipment sends random access scrambling code to a second base station when the user equipment initially requests to access the second base station.

Figure 11:
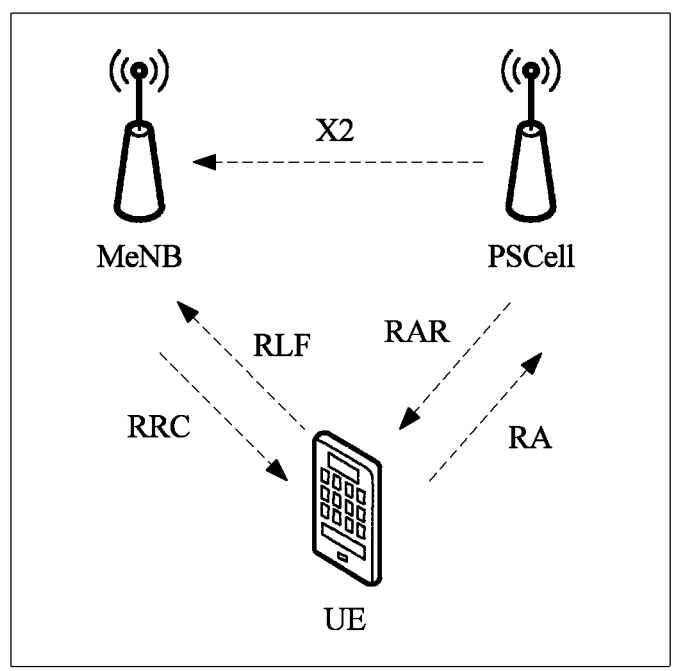
FIG. 11 is a schematic structural diagram of a system in which user equipment interacts with a base station according to an embodiment of the present invention.

With reference to FIG. 11, in specific implementation, to improve a success rate of random access performed by the UE, before the UE initiates a random access process, the first base station sends the first indication information to the UE. The first indication information includes a time period required by the UE to initially request to access a PSCell, or includes a preset first maximum quantity of times the UE sends the random access scrambling code to a PSCell when the UE initially requests to access the PSCell. Setting a time period for an initial random access process can increase duration for accessing the PSCell, and increase a chance of successfully accessing the PSCell. Compared with limiting a quantity of times the UE sends the random access scrambling code, limiting a time period for the random access process is more flexible, and the UE can send the scrambling code many times within the time period, so that efficiency of the random access process is higher. In addition, if the first indication information sent by the first base station includes the preset first maximum quantity of times the UE sends the random access scrambling code to the PSCell when the UE initially requests to access the PSCell, compared with subsequently limiting the quantity of times of sending the random access scrambling code, a quantity of times of initial sending may be appropriately increased, which may also improve random access efficiency.

In an implementable manner, before the first base station sends the first indication information, the first indication information is set by the second base station, and is sent to the first receiving module 100 by using non-mobility information in a radio resource control RRC (Radio Resource Control) reconfiguration message of the first base station.

In an implementable manner, the first indication information is set by the second base station, and is sent to the first receiving module 100 by using configuration information, related to a secondary cell group, in a radio resource control reconfiguration message of the first base station. The first base station may send the first indication information to the UE by using different information in the RRC reconfiguration message, to ensure that the UE can receive the first indication information.

In an implementable manner, the first receiving module 100 obtains the first indication information from second-base-station adding information or dual connectivity establishment information, where the second-base-station adding information or the dual connectivity establishment information is sent by the first base station. The first base station may add the first indication information to the second-base-station adding information or dual connectivity establishment information, and then send the first indication information to the UE by using the different information in the RRC reconfiguration message.

In an implementable manner, the first indication information further includes a preset second maximum quantity of times the first sending module 110 sends the random access scrambling code to the second base station after the user equipment accesses the second base station; and when a quantity of times the first sending module 110 sends the random access scrambling code in a process in which the user equipment requests to access the second base station is greater than the second maximum quantity of times, the second maximum quantity of times is used by the first notification module 120 to notify, by using an upper layer of the user equipment, the first base station that the user equipment fails to request to access the second base station.

In specific implementation, when a random access failure occurs subsequently, the UE notifies the upper layer of the UE that a problem occurs during randomly accessing the second base station, and the upper layer of the UE sends a second base station cell group failure notification to the first base station.

In an implementable manner, the first receiving module 100 is further configured to: if the user equipment accesses the second base station, receive second indication information sent by the first base station, where the second indication information includes a second maximum quantity of times the first sending module 110 sends the random access scrambling code to the second base station.

Optionally, after the UE accesses the PSCell, a quantity of times of sending the random access scrambling code to the PSCell may be limited in a subsequently initiated random access process. The UE continues to initiate a random access process to the PSCell, to obtain an uplink resource. Before initiating the random access process, the UE may still receive the second indication information sent by the first base station, and in this case, the second indication information may include the second maximum quantity of times. Therefore, the first indication information received before the initial random access process does not need to include the second maximum quantity of times.

The first sending module 110 is configured to send the random access scrambling code to the second base station.

In specific implementation, after receiving the first indication information sent by the first base station, the UE initiates a random access process to the PSCell according to the first indication information, that is, the UE sends the random access scrambling code to the PSCell, and waits for feedback of the PSCell.

In an implementable manner, if the first indication information includes the time period required by the user equipment to initially request to access the second base station, a timer is started when the first sending module 110 initially sends the random access scrambling code to the second base station, or when the first sending module 110 initially decides to send the random access scrambling code to the second base station, where a timing time of the timer is the time period in the first indication information.

In an implementable manner, the first sending module 110 continually sends the random access scrambling code to the second base station within the timing time.

It should be noted that, that the UE continually sends the random access scrambling code to the PSCell means that the UE retransmits random access scrambling code to the PSCell after an access failure occurs when the random access scrambling code is sent to the PSCell in a previous time.

In an implementable manner, a timer is started when the first receiving module 100 receives the first indication information sent by the first base station.

Optionally, when the first indication information includes the time period required by the UE to initially request to access the PSCell, a timer needs to be used to perform timing, where a timing time of the timer is the time period required by the UE to initially request to access the PSCell. A time for starting the timer is limited in this embodiment of the present invention; or a time for starting the timer may be set by the second base station, and in this case, the first indication information further includes the time for starting the timer, and the time for starting the timer is sent to the UE by using the first base station. The time for starting the timer may also be locally stored in the UE or implemented inside the UE. The timer may be started at a moment the UE initially sends the random access scrambling code to the PSCell, or may be started at a moment the upper layer of the UE initially decides to send the random access scrambling code to the PSCell, or may be started at a moment the UE obtains the first indication information.

Optionally, after starting the timer, the UE sends the random access scrambling code to the PSCell within the timing time of the timer. If a received random access response (RAR, Random Access Respond) message fed back by the PSCell does not have an identifier of the UE, it is considered that the random access response fails, and the UE continues to retransmit random access scrambling code to the PSCell. Alternatively, after the UE sends a message for a random access response message, a competitive access failure occurs, and the UE continues to retransmit random access scrambling code to the PSCell; after the UE starts the timer, if the UE does not access the PSCell within the timing time of the timer, it is considered as a random access failure.

Optionally, if the first indication information sent by the first base station includes the preset first maximum quantity of times the UE sends the random access scrambling code to the PSCell when the UE initially requests to access the PSCell, counting is started when the UE initially sends the random access scrambling code. If a received RAR message fed back by the PSCell does not have an identifier of the UE, it is considered that the random access response fails, and the UE continues to retransmit random access scrambling code to the PSCell, where a value of a counter is increased by 1 every time the random access scrambling code is sent. For example, the PSCell may set the first maximum quantity of times to 8, and send the first maximum quantity of times to the UE by using the first indication information. A value of the counter is 1 when the UE initially sends the random access scrambling code; the value of the counter is 2 when the UE sends the random access scrambling code for the second time; when a final accumulated value of the counter is 9, because 9 is greater than 8, it is considered as a random access failure. If the UE successfully accesses the PSCell when the value of the counter is less than or equal to 8, the counter stops counting, and waits to start counting according to the second maximum quantity of times when the UE re-initiates to access the PSCell next time. The second maximum quantity of times may be in the first indication information initially received by the UE, or may be in the second indication information received from the first base station after the UE accesses the PSCell.

The first notification module 120 is configured to: if the user equipment fails to access the second base station within the time period according to the first indication information, or if a quantity of times the user equipment sends the random access scrambling code to the second base station when the user equipment initially requests to access the second base station is greater than the first maximum quantity of times according to the first indication information, notify the first base station that the user equipment encounters a second base station cell group failure.

In specific implementation, if the first indication information includes the time period required by the UE to initially request to access the PSCell, the UE reports the second base station cell group failure to the first base station if the UE still does not access the PSCell in the random access process when the time period ends.

Optionally, if the first indication information includes the preset first maximum quantity of times the UE sends the random access scrambling code to the PSCell when the UE initially requests to access the PSCell, the UE reports second base station cell group failure to the first base station when the quantity of times the UE sends the random access scrambling code is greater than the first maximum quantity of times.

In an implementable manner, the second base station cell group failure notified by the first notification module 120 is a failure in initially requesting to access the second base station or a failure in requesting to access the second base station.

In specific implementation, the second base station cell group failure notified by the UE may be merely a failure of the initial random access process, or a failure is directly reported to the first base station regardless of when the failure occurs in the random access process.

In an implementable manner, the second base station cell group failure includes information that indicates timer expiry.

Optionally, the second base station cell group failure may further include information indicating that the quantity of times the UE sends the random access scrambling code is greater than the first maximum quantity of times.

Optionally, if the UE finds the identifier of the UE in the obtained RAR message fed back by the PSCell, it is considered that the UE successfully accesses the PSCell. In addition, if the RAR message further includes an uplink resource subsequently used by the UE, the UE performs data transmission with the PSCell by using the uplink resource.

In an implementable manner, the user equipment further includes a first transmission module 130.

The first transmission module 130 is configured to perform data transmission with the first base station and the second base station in a dual connectivity manner if the user equipment accesses the second base station.

In specific implementation, after the UE successfully accesses the PSCell, the first base station may offload some data to the PSCell, and the PSCell transmits the data to the UE, or the PSCell may directly transmit data from a core network to the UE, to implement dual-connectivity data transmission, improve a transmission rate, and reduce a transmission delay.

In an implementable manner, the user equipment further includes a stopping module 140.

The stopping module 140 is configured to stop the timer if the user equipment accesses the second base station within the timing time of the timer.

In an implementable manner, the user equipment requests to access a cell of the second base station or a primary secondary cell.

In the user equipment provided by using FIG. 1 of embodiments of the present invention, a time in which the user equipment initiates a random access process or a quantity of times the user equipment sends random access scrambling code can be limited by using a primary secondary cell. Therefore, a success rate of accessing the primary secondary cell by the user equipment is improved, and the user equipment can access the primary secondary cell faster. In addition, respective maximum quantities of times the user equipment initially initiates a random access process and continues to initiate a random access process after accessing the primary secondary cell are differentiated, so that efficiency of accessing the primary secondary cell by the user equipment can be improved.

Figure 2:
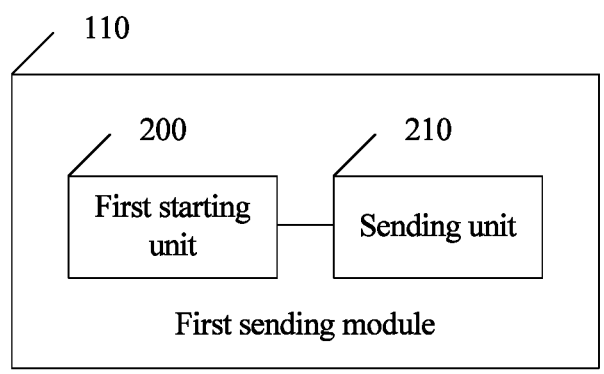
FIG. 2 is a schematic structural diagram of a first sending module of user equipment according to an embodiment of the present invention.

FIG. 2 is a schematic structural diagram of a first sending module of user equipment according to an embodiment of the present invention. A first sending module 110 shown in FIG. 2 includes a first starting unit 200 and a sending unit 210.

The first starting unit 200 is configured to start a timer when the first sending module 110 initially sends random access scrambling code to a second base station, or when the first sending module 110 initially decides to send random access scrambling code to a second base station, where a timing time of the timer is a time period in first indication information.

The sending unit 210 is configured to continually send the random access scrambling code to the second base station within the timing time.

In an implementable manner, the first starting unit 200 is further configured to start a timer when a first receiving module 100 receives first indication information sent by a first base station.

In specific implementation, the first starting unit 200 is specifically configured to control a time for starting the timer when a time in which the user equipment initiates a random access process to a primary secondary cell is limited.

According to FIG. 2 of embodiments of the present invention, a time period of an initial random access process can be set, duration for accessing a PSCell can be increased, and a chance of successfully accessing the PSCell can be increased.

Figure 3:
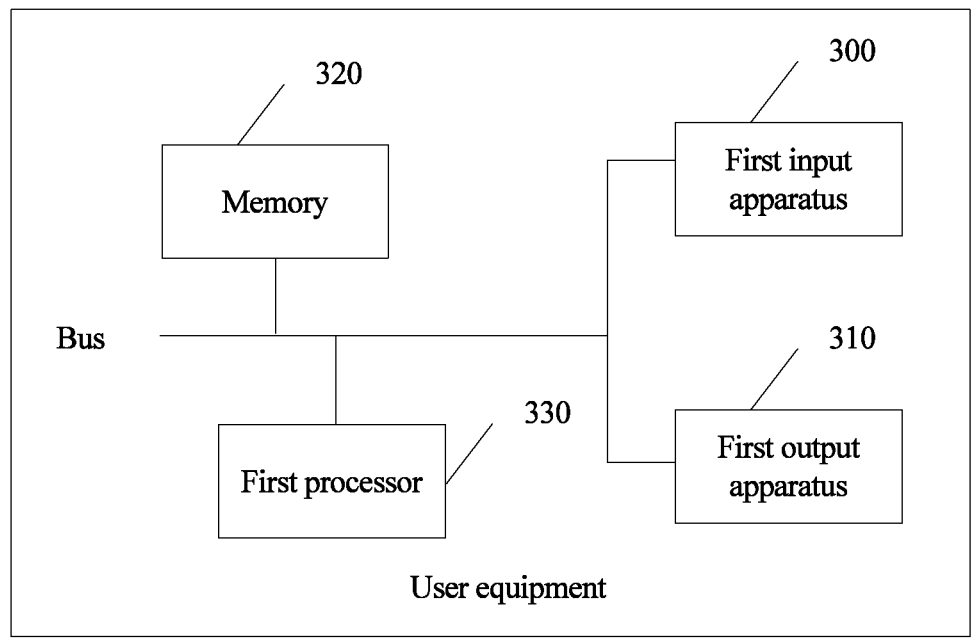
FIG. 3 is a schematic structural diagram of another embodiment of user equipment according to an embodiment of the present invention.

FIG. 3 is a schematic structural diagram of another embodiment of user equipment according to an embodiment of the present invention.

The user equipment shown in FIG. 3 includes a first input apparatus 300, a first output apparatus 310, a first memory 320, and a first processor 330 (there may be one or more first processors 330 in the user equipment, and one processor is used as an example in FIG. 3). In this embodiment of the present invention, the first input apparatus 300, the first output apparatus 310, the first memory 320, and the first processor 330 may be connected by using a bus or in another manner, and a bus connection is used as an example in FIG. 3.

In this embodiment, the first processor 330 may receive, by using the first input apparatus 300, an instruction or signaling sent by a first base station or another base station. Similarly, the first processor 330 may also send an instruction or signaling to a first base station or another base station by using the first output apparatus 310.

The first memory 320 is configured to store a program, and the first processor 330 is configured to invoke the program to perform the following steps. The steps comprise receiving, by using the first input apparatus 300, first indication information sent by a first base station, where the first indication information includes a time period required by the user equipment to initially request to access a second base station, or includes a preset first maximum quantity of times the user equipment sends random access scrambling code to a second base station when the user equipment initially requests to access the second base station; sending the random access scrambling code to the second base station by using the first output apparatus 310; and if the user equipment fails to access the second base station within the time period according to the first indication information, or if a quantity of times the user equipment sends the random access scrambling code to the second base station when the user equipment initially requests to access the second base station is greater than the first maximum quantity of times according to the first indication information, notifying, by using the first output apparatus 310, the first base station that the user equipment encounters a second base station cell group failure.

In an implementable manner, the first processor 330 further performs data transmission with the first base station and the second base station in a dual connectivity manner if the user equipment accesses the second base station.

In an implementable manner, the first indication information is set by the second base station, and is sent to the first input apparatus 300 by using non-mobility information in a radio resource control reconfiguration message of the first base station.

In an implementable manner, the first indication information is set by the second base station, and is sent to the first input apparatus 300 by using configuration information, related to a secondary cell group, in a radio resource control reconfiguration message of the first base station.

In an implementable manner, the first processor 330 obtains the first indication information from second-base-station adding information or dual connectivity establishment information, where the second-base-station adding information or the dual connectivity establishment information is sent by the first base station.

In an implementable manner, if the first indication information includes the time period required by the user equipment to initially request to access the second base station, the first processor 330 sends the random access scrambling code to the second base station, and performs the following steps. The steps comprise starting a timer when the first processor 330 initially sends the random access scrambling code to the second base station, or when the first processor 330 initially decides to send the random access scrambling code to the second base station, where a timing time of the timer is the time period in the first indication information; and continually sending the random access scrambling code to the second base station within the timing time.

In an implementable manner, if the first indication information includes the time period required by the user equipment to initially request to access the second base station, the first processor 330 receives the first indication information sent by the first base station, and starts a timer when the first indication information sent by the first base station is received.

In an implementable manner, the second base station cell group failure notified by the first processor 330 is a failure in initially requesting to access the second base station or a failure in requesting to access the second base station.

In an implementable manner, the second base station cell group failure includes information that indicates timer expiry.

In an implementable manner, the first processor 330 further stops the timer if the user equipment accesses the second base station within the timing time of the timer.

In an implementable manner, the first indication information further includes a preset second maximum quantity of times the first processor 330 sends the random access scrambling code to the second base station after the first processor 330 accesses the second base station; and when a quantity of times the first processor 330 sends the random access scrambling code in a process of requesting to access the second base station is greater than the second maximum quantity of times, the second maximum quantity of times is used by the first processor 330 to notify, by using an upper layer of the user equipment, the first base station that the user equipment fails to request to access the second base station.

In an implementable manner, the first processor 330 further performs the following step. If the user equipment accesses the second base station, receiving second indication information sent by the first base station, where the second indication information includes a second maximum quantity of times the first processor 330 sends the random access scrambling code to the second base station.

In an implementable manner, the first processor 330 requests to access a cell of the second base station or a primary secondary cell.

The user equipment provided by using FIG. 3 of embodiments of the present invention includes a first input apparatus, a first output apparatus, a first memory, and a first processor. A time in which the user equipment initiates a random access process or a quantity of times the user equipment sends random access scrambling code can be limited by using a primary secondary cell. Therefore, a success rate of accessing the primary secondary cell by the first processor is improved, and the user equipment can access the primary secondary cell faster. In addition, respective maximum quantities of times the user equipment initially initiates a random access process and continues to initiate a random access process after accessing the primary secondary cell are differentiated, so that efficiency of accessing the primary secondary cell by the user equipment can be improved.

Figure 4:
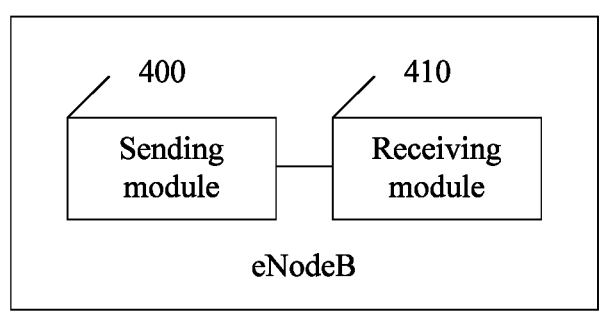
FIG. 4 is a schematic structural diagram of an embodiment of a base station according to an embodiment of the present invention.

FIG. 4 is a schematic structural diagram of an embodiment of a base station according to an embodiment of the present invention. The base station involved in this embodiment of the present invention is a first base station that is configured to control communication between user equipment and a second base station. A second base station involved in this embodiment of the present invention may be a primary secondary cell PSCell. An involved process of requesting to access the second base station may be a random access process. All information, such as a parameter and indication information, obtained by the UE from the first base station is set by the second base station, transmitted to the first base station by using an X2 interface of the second base station, and then sent to the UE by the first base station.

The base station involved in this embodiment of the present invention includes a sending module 400 and a receiving module 410.

The sending module 400 is configured to send first indication information to user equipment, where the first indication information includes a time period required by the user equipment to initially request to access a second base station, or includes a preset first maximum quantity of times the user equipment sends random access scrambling code to a second base station when the user equipment initially requests to access the second base station.

In specific implementation, when the UE needs to perform data transmission with a PSCell, the PSCell sets a corresponding parameter to generate the first indication information, and sends the first indication information to the first base station; and the first base station sends the first indication information to the UE. The first indication information includes the time period required by the user equipment to initially request to access the second base station, or includes the preset first maximum quantity of times the user equipment sends the random access scrambling code to the second base station when the user equipment initially requests to access the second base station.

The first indication information includes a time period required by the UE to initially request to access the PSCell, or includes a preset first maximum quantity of times the UE sends the random access scrambling code to the PSCell when the UE initially requests to access the PSCell. Setting a time period for an initial random access process can increase duration for accessing the PSCell, and increase a chance of successfully accessing the PSCell. Compared with limiting a quantity of times the UE sends the random access scrambling code, limiting a time period for a random access process is more flexible, and the UE can send the scrambling code many times within the time period, so that efficiency of the random access process is higher. In addition, if the first indication information sent by the first base station includes the preset first maximum quantity of times the UE sends the random access scrambling code to the PSCell when the UE initially requests to access the PSCell, compared with subsequently limiting the quantity of times of sending the random access scrambling code, a quantity of times of initial sending may be appropriately increased, which may also improve random access efficiency. If the time period required by the UE to initially request to access the PSCell is limited, a timer is used to perform timing; and for controlling a time for starting the timer, reference is made to the embodiment of FIG. 1, and details are not described again in this embodiment. If the maximum quantity of times the UE sends the random access scrambling code to the PSCell when the UE initially requests to access the PSCell is limited, a counter may be used to perform counting; and similarly, for a specific manner of counting, by the counter, the quantity of times of sending the random scrambling code, reference is made to the embodiment of FIG. 1, and details are not described again in this embodiment.

In an implementable manner, the first indication information is set by the second base station, and is sent to the user equipment by using non-mobility information in a radio resource control reconfiguration message of the sending module 400.

In an implementable manner, the first indication information is set by the second base station, and is sent to the user equipment by using configuration information, related to a secondary cell group, in a radio resource control reconfiguration message of the sending module 400. The first base station may send the first indication information to the UE by using different information in the RRC reconfiguration message, to ensure that the UE can receive the first indication information.

In an implementable manner, the first indication information further includes a preset second maximum quantity of times the user equipment sends the random access scrambling code to the second base station after the user equipment accesses the second base station; and when a quantity of times the user equipment sends the random access scrambling code in a process of requesting to access the second base station is greater than the second maximum quantity of times, the second maximum quantity of times is used by the receiving module 410 to receive a second base station cell group failure notified by the user equipment by using an upper layer of the user equipment.

In specific implementation, when a random access failure occurs subsequently, the UE notifies the upper layer of the UE that a problem occurs during randomly accessing the second base station, and the upper layer of the UE sends a second base station cell group failure notification to the first base station.

In an implementable manner, the sending module 400 is further configured to send second indication information to the user equipment if the user equipment accesses the second base station, where the second indication information includes a second maximum quantity of times the user equipment sends the random access scrambling code to the second base station.

Optionally, after the UE accesses the PSCell, the UE continues to initiate a random access process to the PSCell, to obtain an uplink resource. Before initiating the random access process, the UE may still receive the second indication information sent by the first base station, and in this case, the second indication information may include the second maximum quantity of times. Therefore, the first indication information received before the initial random access process does not need to include the second maximum quantity of times.

The receiving module 410 is configured to: if the user equipment fails to request to access the second base station within the time period according to the first indication information, or if a quantity of times the user equipment sends the random access scrambling code to the second base station when the user equipment initially requests to access the second base station is greater than the first maximum quantity of times according to the first indication information, receive a second base station cell group failure notification sent by the user equipment.

In specific implementation, when a random access process of the UE still fails after the timing time of the timer in the embodiment of FIG. 1 ends, or a quantity of times the UE sends the random access scrambling code to the PSCell when the UE initially requests to access the PSCell is greater than the first maximum quantity of times, the second base station cell group failure notification is sent to the first base station. After the UE accesses the PSCell, a quantity of times of sending the random access scrambling code to the PSCell in a subsequently initiated random access process, that is, the second maximum quantity of times, may be limited. If a quantity of times the UE sends the random access scrambling code to the PSCell when the UE subsequently accesses the PSCell is greater than the second maximum quantity of times, the UE notifies the UE that a problem occurs during randomly accessing the second base station, and the upper layer of the UE sends second base station cell group failure notification to the first base station.

In an implementable manner, the second base station cell group failure notified by the user equipment is a failure in initially requesting to access the second base station or a failure in requesting to access the second base station.

In specific implementation, the second base station cell group failure notified by the UE may be merely a failure of the initial random access process, or a failure is directly reported to the first base station regardless of when the failure occurs in the random access process.

In an implementable manner, the secondary cell group failure includes information that indicates timer expiry.

Optionally, the second base station cell group failure may further include information indicating that the quantity of times the UE sends the random access scrambling code is greater than the first maximum quantity of times.

In the base station provided by using FIG. 4 of embodiments of the present invention, a time in which user equipment initiates a random access process or a quantity of times user equipment sends random access scrambling code can be limited by using a primary secondary cell, and limited content is sent to the user equipment. Therefore, a success rate of accessing the primary secondary cell by the user equipment is improved, and the user equipment can access the primary secondary cell faster. In addition, respective maximum quantities of times the user equipment initially initiates a random access process and continues to initiate a random access process after accessing the primary secondary cell are differentiated, so that efficiency of accessing the primary secondary cell by the user equipment can be improved.

Figure 5:
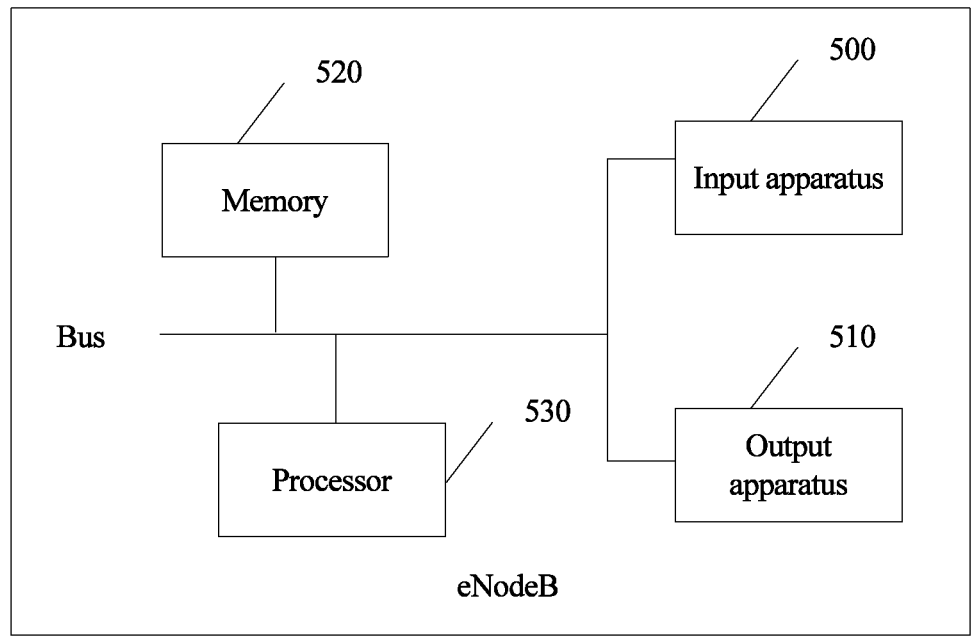
FIG. 5 is a schematic structural diagram of another embodiment of a base station according to an embodiment of the present invention.

FIG. 5 is a schematic structural diagram of another embodiment of a base station according to an embodiment of the present invention.

The base station shown in FIG. 5 includes an input apparatus 500, an output apparatus 510, a memory 520, and a processor 530 (there may be one or more processors 530 in the base station, and one processor 530 is used as an example in FIG. 5). In this embodiment of the present invention, the input apparatus 500, the output apparatus 510, the processor 520, and the memory 530 may be connected by using a bus or in another manner, and a bus connection is used as an example in FIG. 5.

In this embodiment, the processor 530 may receive, by using the input apparatus 500, an instruction or signaling sent by user equipment or another base station. Similarly, the processor 530 may also send an instruction or signaling to user equipment or another base station by using the output apparatus 510.

The memory 520 is configured to store a program, and the processor 530 is configured to invoke the program to perform the following steps. The steps comprise sending first indication information to user equipment by using the output apparatus 510, where the first indication information includes a time period required by the user equipment to initially request to access a second base station, or includes a preset first maximum quantity of times the user equipment sends random access scrambling code to a second base station when the user equipment initially requests to access the second base station; and if the user equipment fails to request to access the second base station within the time period according to the first indication information, or if a quantity of times the user equipment sends the random access scrambling code to the second base station when the user equipment initially requests to access the second base station is greater than the first maximum quantity of times according to the first indication information, receiving, by using the input apparatus 500, a second base station cell group failure notification sent by the user equipment.

In an implementable manner, the first indication information is set by the second base station, and is sent to the user equipment by using non-mobility information in a radio resource control reconfiguration message of the output apparatus 510.

In an implementable manner, the first indication information is set by the second base station, and is sent to the user equipment by using configuration information, related to a secondary cell group, in a radio resource control reconfiguration message of the output apparatus 510.

In an implementable manner, a second base station cell group failure notified by the user equipment is a failure in initially requesting to access the second base station or a failure in requesting to access the second base station.

In an implementable manner, the second base station cell group failure includes information that indicates timer expiry.

In an implementable manner, the first indication information further includes a preset second maximum quantity of times the user equipment sends the random access scrambling code to the second base station after the user equipment accesses the second base station; and when a quantity of times the user equipment sends the random access scrambling code in a process of requesting to access the second base station is greater than the second maximum quantity of times, the second maximum quantity of times is used by the input apparatus 500 to receive a second base station cell group failure notified by the user equipment by using an upper layer of the user equipment.

In an implementable manner, the processor 530 further performs the following step:

sending, by the output apparatus 510, second indication information to the user equipment if the user equipment accesses the second base station, where the second indication information includes a second maximum quantity of times the user equipment sends the random access scrambling code to the second base station.

The base station provided by using FIG. 5 of embodiments of the present invention includes an input apparatus, an output apparatus, a memory, and a processor. A time in which user equipment initiates a random access process or a quantity of times user equipment sends random access scrambling code can be limited by using a primary secondary cell, and the processor sends limited content to the user equipment. Therefore, a success rate of accessing the primary secondary cell by the user equipment is improved, and the user equipment can access the primary secondary cell faster. In addition, respective maximum quantities of times the user equipment initially initiates a random access process and continues to initiate a random access process after accessing the primary secondary cell are differentiated, so that efficiency of accessing the primary secondary cell by the user equipment can be improved.

Figure 6:
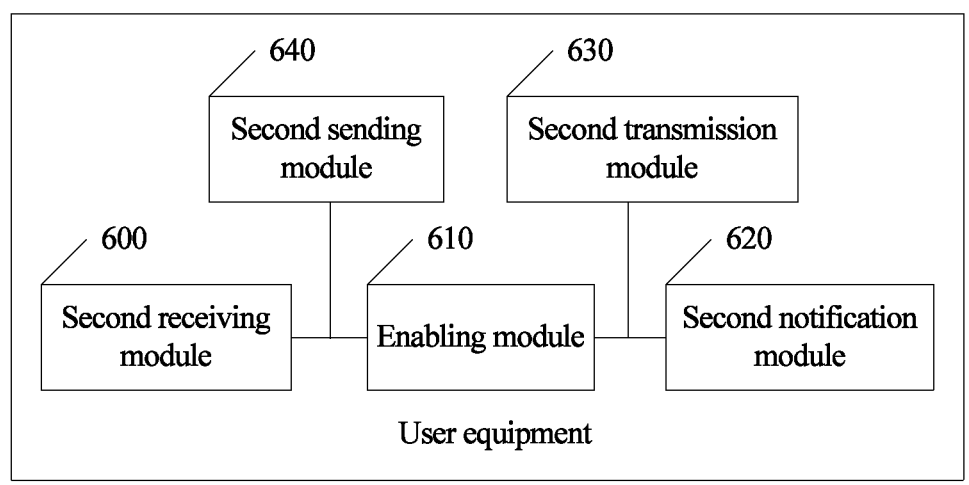
FIG. 6 is a schematic structural diagram of a third embodiment of user equipment according to an embodiment of the present invention.

FIG. 6 is a schematic structural diagram of a third embodiment of user equipment according to an embodiment of the present invention. A second base station involved in this embodiment of the present invention may be a primary secondary cell PSCell. After the UE accesses the PSCell, the UE performs radio link monitoring on a radio link of the PSCell in subsequent data transmission with the PSCell. In this embodiment of the present invention, a condition for triggering the UE to perform the radio link monitoring is described by using an example.

The user equipment involved in this embodiment of the present invention includes a second receiving module 600 and an enabling module 610.

The second receiving module 600 is configured to receive second indication information sent by a first base station, where the second indication information includes a parameter of radio link monitoring performed on a radio link of a primary secondary cell.

In specific implementation, the parameter of the radio link monitoring may be a parameter such as a synchronization counter, an unsynchronization counter, or a timing time of an unsynchronization timer. The parameter of the radio link monitoring may further include a synchronization threshold and an unsynchronization threshold. The synchronization threshold and the unsynchronization threshold may further be obtained inside the UE.

Optionally, when the second receiving module 600 receives the parameter sent by the first base station, the primary secondary cell is a serving cell that is of the second base station and that has provided a service for the UE.

In specific implementation, the parameter received by the UE is a current PSCell that is performing data transmission with the UE.

In an implementable manner, because the second base station has several primary cells, in a moving process of the UE, a signal between the UE and an originally accessed primary cell weakens; in this case, the second base station may replace a current PSCell with another primary cell, and the UE continues to perform data transmission with the another primary cell; a parameter received by the UE in this case is a parameter of radio link monitoring performed on the another primary cell.

Optionally, the second indication information is set by the second base station, and is sent to the second receiving module 600 by using non-mobility information in a radio resource control reconfiguration message of the first base station.

Optionally, the second indication information is set by the second base station, and is sent to the second receiving module 600 by using configuration information, related to a secondary cell group, in a radio resource control reconfiguration message of the first base station.

Optionally, the second receiving module 600 obtains the second indication information from primary secondary cell adding information or dual connectivity establishment information sent by the first base station.

In specific implementation, the following briefly describes a radio link monitoring process initiated by the UE. In radio link monitoring, the UE evaluates signal quality of a radio link in a previous period every other particular period, and compares the signal quality with the synchronization threshold and the unsynchronization threshold. When the signal quality is less than the unsynchronization threshold, a value of a corresponding unsynchronization counter is increased by 1, and a synchronization counter is cleared; when the signal quality is greater than the synchronization threshold, a value of a corresponding synchronization counter is increased by 1, and an unsynchronization counter is cleared. Therefore, when either of the synchronization counter and the unsynchronization counter starts counting, the other one is cleared immediately until the other one starts counting. When a value continuously accumulated by the unsynchronization counter reaches a predetermined quantity, the unsynchronization timer is started (it should be noted that the unsynchronization timer is different from the timer mentioned in the embodiments of FIG. 1 to FIG. 5); if a value continuously accumulated by the synchronization counter does not reach a predetermined quantity within a time predetermined by the unsynchronization timer, it indicates a radio link failure, and the UE reports a second base station cell group failure to the first base station. All parameters required in the radio link monitoring process may be set by the second base station, and then forwarded by the first base station to the user equipment.

The enabling module 610 is configured to enable the radio link monitoring according to a triggering condition, where the condition for triggering the radio link monitoring includes at least one of the following: when the second receiving module 600 receives the parameter, sent by the first base station, of the radio link monitoring performed on the radio link of the primary secondary cell; or when the user equipment accesses the primary secondary cell; or when a second sending module 640 of the user equipment sends random access scrambling code to the primary secondary cell.

In specific implementation, for the condition 1, the radio link monitoring is enabled at a moment the UE receives the parameter of the radio link monitoring sent by the first base station; for the condition 2, the radio link monitoring is enabled when the UE successfully accesses the PSCell, and the UE performs the radio link monitoring by using a previously received parameter, sent by the first base station, of the radio link monitoring performed on the radio link of the PSCell; and for the condition 3, the radio link monitoring is enabled when the UE decides to access the PSCell by using a random access process. The triggering condition for enabling the radio link monitoring is clearly limited, which helps the UE implement the radio link monitoring, and improves efficiency of the radio link monitoring.

In an implementable manner, the enabling module includes a counting unit (not shown in the figure) and a timer starting unit (not shown in the figure).

The counting unit (not shown in the figure) is configured to perform synchronized counting and/or unsynchronized counting according to the triggering condition.

In specific implementation, the counting unit (not shown in the figure) includes the foregoing synchronization counter and unsynchronization counter. In this embodiment of the present invention, the synchronization counter and/or the unsynchronization counter may be started when at least one triggering condition is met, that is, the synchronization counter and/or the unsynchronization counter may be started before the user equipment accesses the primary secondary cell, or may be started after the user equipment accesses the primary secondary cell, or may be started at any moment.

The timer starting unit (not shown in the figure) is configured to start an unsynchronization timer.

Optionally, a condition for the timer starting unit (not shown in the figure) to start the unsynchronization timer includes: the triggering condition is met, and a value accumulated by the counting unit according to the unsynchronized counting is greater than or equal to a first preset value.

In specific implementation, the timer starting unit (not shown in the figure) starts the unsynchronization timer when the triggering condition is met and after the counting unit (not shown in the figure) performs the synchronized counting and/or the unsynchronized counting and the value continuously accumulated by the unsynchronization counter reaches the predetermined quantity.

In an implementable manner, the unsynchronization timer is started when the value continuously accumulated by the unsynchronization counter reaches the predetermined quantity and the user equipment accesses the primary secondary cell. A time sequence of reaching the predetermined quantity by the value continuously accumulated by the unsynchronization counter and accessing the primary secondary cell by the user equipment is not limited, and the unsynchronization timer may be started provided that the foregoing two conditions are met. Therefore, even if the user equipment starts the synchronization counter and/or the unsynchronization counter at any moment to respectively perform the synchronized counting and/or the unsynchronized counting, if the user equipment still does not access the primary secondary cell, the unsynchronization timer is not started even a value accumulated according to the unsynchronized counting is greater than or equal to the first preset value; therefore, an occasion for starting the unsynchronization timer is ensured.

Optionally, the user equipment accesses the primary secondary cell in any one of the following manners: a random access process initiated by the user equipment to the primary secondary cell is successfully completed, or the user equipment accesses the primary secondary cell within a maximum quantity of times the second sending module 640 sends the random access scrambling code, or the user equipment accesses the primary secondary cell within a time period required for initially requesting to access the primary secondary cell, or when a second transmission module 630 of the user equipment begins to perform data transmission with the primary secondary cell. The manner in which the UE accesses the PSCell includes the access manner in the embodiments of FIG. 1 to FIG. 5, and for a specific implementation process, reference is made to the embodiments of FIG. 1 to FIG. 5, and details are not described again in this embodiment.

In an implementable manner, the user equipment further includes a second notification module 620.

The second notification module 620 is configured to: if a radio link failure occurs when the user equipment performs the radio link monitoring, notify the first base station that the user equipment encounters a second base station cell group failure.

In specific implementation, if the UE encounters the radio link failure, the UE reports a random access problem to an upper layer of the UE, and the upper layer of the UE notifies the first base station of the radio link failure.

In an implementable manner, a condition for the radio link failure to occur when the user equipment performs the radio link monitoring is unsynchronization timer expiry.

Specifically, the condition for the radio link failure to occur when the user equipment performs the radio link monitoring is as follows: a value accumulated by the counting unit (not shown in the figure) according to the synchronized counting within the time predetermined by the unsynchronization timer is less than a second preset value. If the value continuously accumulated by the synchronization counter does not reach the predetermined quantity within the time predetermined by the unsynchronization timer, it indicates the radio link failure, and the user equipment reports the second base station cell group failure to the first base station.

According to FIG. 6 of embodiments of the present invention, a condition for triggering radio link monitoring can be specified after user equipment accesses a primary secondary cell, so that the UE can fully control a time for enabling the radio link monitoring, and an essential function of the radio link monitoring performed by the user equipment is shown.

Figure 7:
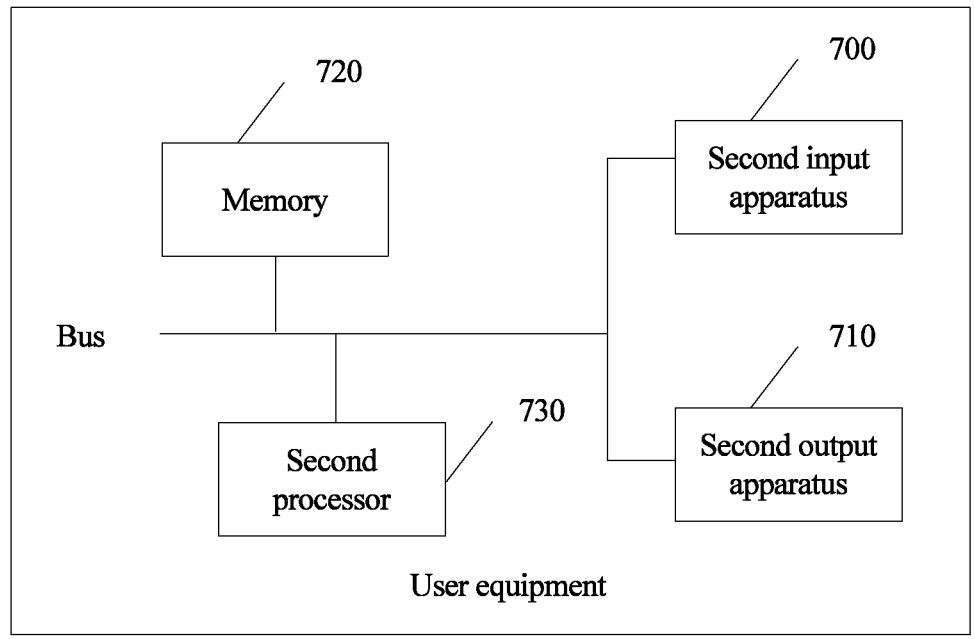
FIG. 7 is a schematic structural diagram of a fourth embodiment of user equipment according to an embodiment of the present invention.

FIG. 7 is a schematic structural diagram of a fourth embodiment of user equipment according to an embodiment of the present invention.

The user equipment shown in FIG. 7 includes a second input apparatus 700, a second output apparatus 710, a second memory 720, and a second processor 730 (there may be one or more second processors 730 in the user equipment, and one processor is used as an example in FIG. 7). In this embodiment of the present invention, the second input apparatus 700, the second output apparatus 710, the second memory 720, and the second processor 730 may be connected by using a bus or in another manner, and a bus connection is used as an example in FIG. 7.

In this embodiment, the second processor 730 may receive, by using the second input apparatus 700, an instruction or signaling sent by a base station or another device. Similarly, the second processor 730 may also send an instruction or signaling to a base station or another device by using the second output apparatus 710.

The second memory 720 is configured to store a program, and the second processor 730 is configured to invoke the program to perform the following steps. The steps comprise receiving, by using the second input apparatus 700, second indication information sent by a first base station, where the second indication information includes a parameter of radio link monitoring performed on a radio link of a primary secondary cell; and enabling the radio link monitoring according to a triggering condition, where the condition for triggering the radio link monitoring includes at least one of the following: when the parameter, sent by the first base station, of the radio link monitoring performed on the radio link of the primary secondary cell is received by using the second input apparatus 700; or when the primary secondary cell is accessed; or when random access scrambling code is sent to the primary secondary cell by using the second output apparatus 710.

In an implementable manner, the second processor 730 further performs the following steps performing synchronized counting and/or unsynchronized counting according to the triggering condition; and starting an unsynchronization timer.

In an implementable manner, a condition for the second processor 730 to start the unsynchronization timer includes: the triggering condition is met, and a value accumulated according to the unsynchronized counting is greater than or equal to a first preset value.

In an implementable manner, when the parameter sent by the first base station is received by using the second input apparatus 700, the primary secondary cell is a serving cell that is of the second base station and that has provided a service for the UE.

In an implementable manner, the second processor 730 further performs the following step: if a radio link failure occurs during the radio link monitoring, notifying, by using the second output apparatus 710, the first base station that the user equipment encounters a second base station cell group failure.

In an implementable manner, the second indication information is set by the second base station, and is sent to the second input apparatus 700 by using non-mobility information in a radio resource control reconfiguration message of the first base station.

In an implementable manner, the second indication information is set by the second base station, and is sent to the second input apparatus 700 by using configuration information, related to a secondary cell group, in a radio resource control reconfiguration message of the first base station.

In an implementable manner, the second input apparatus 700 obtains the second indication information from primary secondary cell adding information or dual connectivity establishment information sent by the first base station.

In an implementable manner, a condition for the radio link failure to occur when the user equipment performs the radio link monitoring is unsynchronization timer expiry.

In an implementable manner, the second processor 730 accesses the primary secondary cell in any one of the following manners: a random access process initiated by the second processor 730 to the primary secondary cell is successfully completed; or the second processor 730 accesses the primary secondary cell within a maximum quantity of times of sending the random access scrambling code by using the second output apparatus 710; or the second processor 730 accesses the primary secondary cell within a time period required for initially requesting to access the primary secondary cell; or when the second processor 730 begins to perform data transmission with the primary secondary cell by using the second output apparatus 710.

According to FIG. 7 of embodiments of the present invention, a condition for triggering radio link monitoring can be specified after user equipment accesses a primary secondary cell, so that the UE can fully control a time for enabling the radio link monitoring, and an essential function of the radio link monitoring performed by the user equipment is shown.

Figure 8:
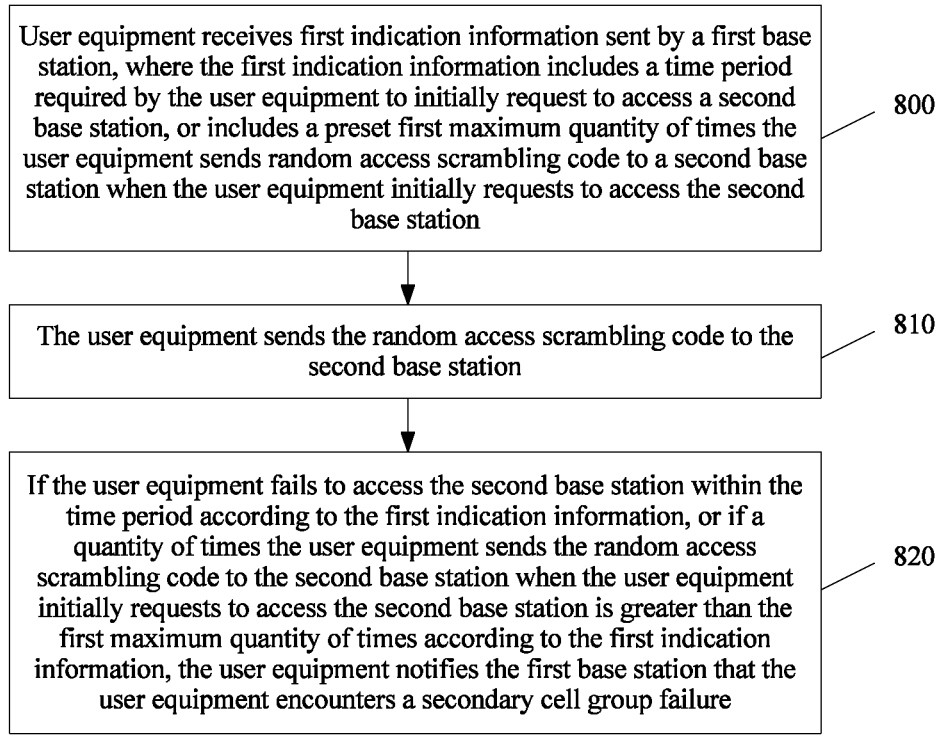
FIG. 8 is a schematic flowchart of an embodiment of a base station access method according to an embodiment of the present invention.

FIG. 8 is a schematic flowchart of an embodiment of a base station access method according to an embodiment of the present invention. A base station involved in this embodiment of the present invention is a first base station that is configured to control communication between user equipment and a second base station. A second base station involved in this embodiment of the present invention may be a primary secondary cell PSCell. An involved process of requesting to access the second base station may be a random access process. All information, such as a parameter and indication information, obtained by the UE from the first base station is set by the second base station, transmitted to the first base station by using an X2 interface of the second base station, and then sent to the UE by the first base station.

As shown in FIG. 8, the base station access method in this embodiment of the present invention may include the following steps.

Step 800: User equipment receives first indication information sent by a first base station, where the first indication information includes a time period required by the user equipment to initially request to access a second base station, or includes a preset first maximum quantity of times the user equipment sends random access scrambling code to a second base station when the user equipment initially requests to access the second base station.

Step 810: The user equipment sends the random access scrambling code to the second base station.

Step 820: If the user equipment fails to access the second base station within the time period according to the first indication information, or if a quantity of times the user equipment sends the random access scrambling code to the second base station when the user equipment initially requests to access the second base station is greater than the first maximum quantity of times according to the first indication information, the user equipment notifies the first base station that the user equipment encounters a second base station cell group failure.

In specific implementation, to improve a success rate of random access performed by the UE, before the UE initiates a random access process, the first base station sends the first indication information to the UE. The first indication information includes a time period required by the UE to initially request to access a PSCell, or includes a preset first maximum quantity of times the UE sends the random access scrambling code to a PSCell when the UE initially requests to access the PSCell. Setting a time period for an initial random access process can increase duration for accessing the PSCell, and increase a chance of successfully accessing the PSCell. Compared with limiting the quantity of times the UE sends the random access scrambling code, limiting a time period for the random access process is more flexible, and the UE can send the scrambling code many times within the time period, so that efficiency of the random access process is higher. In addition, if the first indication information sent by the first base station includes the preset first maximum quantity of times the UE sends the random access scrambling code to the PSCell when the UE initially requests to access the PSCell, compared with subsequently limiting the quantity of times of sending the random access scrambling code, a quantity of times of initial sending may be appropriately increased, which may also improve random access efficiency.

In specific implementation, after receiving the first indication information sent by the first base station, the UE initiates a random access process to the PSCell according to the first indication information, that is, the UE sends the random access scrambling code to the PSCell, and waits for feedback of the PSCell.

Optionally, the UE sends the random access scrambling code to the PSCell within the time period. If a received RAR message fed back by the PSCell does not have an identifier of the UE, it is considered that the random access response fails, and the UE continues to retransmit random access scrambling code to the PSCell. Alternatively, after the UE sends a message for a random access response message, a competitive access failure occurs, and the UE continues to retransmit random access scrambling code to the PSCell; after the UE starts a timer, if the UE does not access the PSCell within a timing time of the timer, it is considered as a random access failure.

In specific implementation, if the first indication information includes the time period required by the UE to initially request to access the PSCell, the UE reports the second base station cell group failure to the first base station if the UE still does not access the PSCell in the random access process when the time period ends.

In an implementable manner, the user equipment performs data transmission with the first base station and the second base station in a dual connectivity manner if the user equipment accesses the second base station.

In an implementable manner, the first indication information is set by the second base station, and is sent to the user equipment by using non-mobility information in a radio resource control reconfiguration message of the first base station.

In an implementable manner, the first indication information is set by the second base station, and is sent to the user equipment by using configuration information, related to a secondary cell group, in a radio resource control reconfiguration message of the first base station.

In an implementable manner, the user equipment obtains the first indication information from second-base-station adding information or dual connectivity establishment information, where the second-base-station adding information or the dual connectivity establishment information is sent by the first base station.

In an implementable manner, if the first indication information includes the time period required by the user equipment to initially request to access the second base station, the user equipment starts a timer when the user equipment initially sends the random access scrambling code to the second base station, or when the user equipment initially decides to send the random access scrambling code to the second base station, where a timing time of the timer is the time period in the first indication information; and the user equipment continually sends the random access scrambling code to the second base station within the timing time. The foregoing two limiting conditions have been described in detail in the embodiment of FIG. 1, and details are not described again in this embodiment.

In an implementable manner, if the first indication information includes the time period required by the user equipment to initially request to access the second base station, the user equipment starts a timer when the user equipment receives the first indication information sent by the first base station. In specific implementation, a time for starting the timer is specified, and the timer may be started when the UE initially sends the random access scrambling code to the PSCell, or may be started when the UE initially decides to send the random access scrambling code to the PSCell, or may be started when the UE receives the first indication information sent by the first base station. For specific implementation steps of starting the timer, reference is made to the embodiment of FIG. 1, and details are not described again in this embodiment.

In an implementable manner, the second base station cell group failure notified by the user equipment is a failure in initially requesting to access the second base station or a failure in requesting to access the second base station.

In an implementable manner, the second base station cell group failure includes information that indicates timer expiry.

In an implementable manner, the user equipment stops the timer if the user equipment accesses the second base station within the timing time of the timer.

In an implementable manner, the first indication information further includes a preset second maximum quantity of times the user equipment sends the random access scrambling code to the second base station after the user equipment accesses the second base station; and when a quantity of times the user equipment sends the random access scrambling code in a process of requesting to access the second base station is greater than the second maximum quantity of times, the second maximum quantity of times is used by the user equipment to notify, by using an upper layer of the user equipment, the first base station that the user equipment fails to request to access the second base station.

In an implementable manner, if the user equipment accesses the second base station, the user equipment receives second indication information sent by the first base station, where the second indication information includes a second maximum quantity of times the user equipment sends the random access scrambling code to the second base station. In the initial random access process, requesting to access the second base station may be performed by limiting a time period for initial random access and a quantity of times of sending the random access scrambling code.

In an implementable manner, the user equipment requests to access a cell of the second base station or a primary secondary cell, and after the UE accesses the PSCell, in a subsequent random access process, requesting to access the PSCell may be performed by limiting the second maximum quantity of times the UE sends the random access scrambling code.

According to FIG. 8 of embodiments of the present invention, a time in which user equipment initiates a random access process or a quantity of times user equipment sends random access scrambling code can be limited by using a primary secondary cell. Therefore, a success rate of accessing the primary secondary cell by the user equipment is improved, and the user equipment can access the primary secondary cell faster. In addition, respective maximum quantities of times the user equipment initially initiates a random access process and continues to initiate a random access process after accessing the primary secondary cell are differentiated, so that efficiency of accessing the primary secondary cell by the user equipment can be improved.

Figure 9:
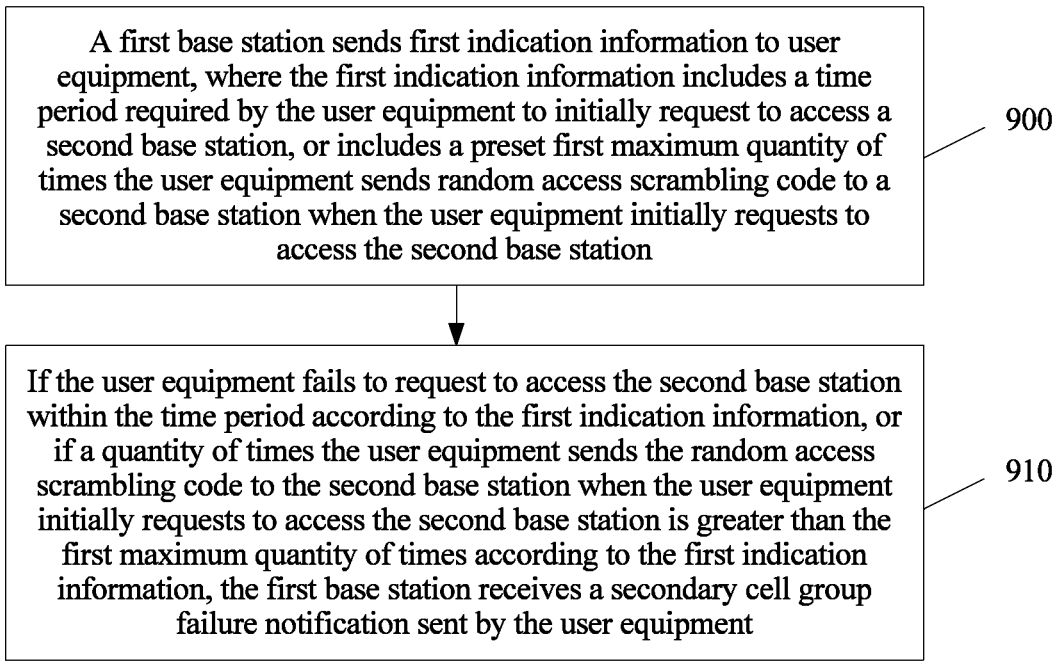
FIG. 9 is a schematic flowchart of another embodiment of a base station access method according to an embodiment of the present invention.

FIG. 9 is a schematic flowchart of another embodiment of a base station access method according to an embodiment of the present invention.

The another embodiment of the base station access method shown in FIG. 9 may include the following steps.

Step 900: A first base station sends first indication information to user equipment, where the first indication information includes a time period required by the user equipment to initially request to access a second base station, or includes a preset first maximum quantity of times the user equipment sends random access scrambling code to a second base station when the user equipment initially requests to access the second base station.

Step 910: If the user equipment fails to request to access the second base station within the time period according to the first indication information, or if a quantity of times the user equipment sends the random access scrambling code to the second base station when the user equipment initially requests to access the second base station is greater than the first maximum quantity of times according to the first indication information, the first base station receives a second base station cell group failure notification sent by the user equipment.

In specific implementation, when the UE needs to perform data transmission with a PSCell, the PSCell sets a corresponding parameter to generate the first indication information, and sends the first indication information to the first base station; and the first base station sends the first indication information to the UE. The first indication information includes the time period required by the user equipment to initially request to access the second base station, or includes the preset first maximum quantity of times the user equipment sends the random access scrambling code to the second base station when the user equipment initially requests to access the second base station.

The first indication information includes a time period required by the UE to initially request to access the PSCell, or includes a preset first maximum quantity of times the UE sends the random access scrambling code to the PSCell when the UE initially requests to access the PSCell. If the time period required by the UE to initially request to access the PSCell is limited, a timer is used to perform timing; and for controlling a time for starting the timer, reference is made to the embodiment of FIG. 1, and details are not described again in this embodiment. If the maximum quantity of times the UE sends the random access scrambling code to the PSCell when the UE initially requests to access the PSCell is limited, a counter may be used to perform counting; and similarly, for for a specific manner of counting, by the counter, the quantity of times of sending the random scrambling code, reference is made to the embodiment of FIG. 1, and details are not described again in this embodiment.

In specific implementation, when a random access process of the UE still fails after the timing time of the timer in the embodiment of FIG. 1 ends, or a quantity of times the UE sends the random access scrambling code to the PSCell when the UE initially requests to access the PSCell is greater than the first maximum quantity of times, the second base station cell group failure notification is sent to the first base station. After the UE accesses the PSCell, a quantity of times of sending the random access scrambling code to the PSCell in a subsequently initiated random access process, that is, a second maximum quantity of times, may be limited. If a quantity of times the UE sends the random access scrambling code to the PSCell when the UE subsequently accesses the PSCell is greater than the second maximum quantity of times, the UE notifies the UE that a problem occurs during randomly accessing the second base station, and an upper layer of the UE sends the second base station cell group failure notification to the first base station.

In an implementable manner, the first indication information is set by the second base station, and is sent to the user equipment by using non-mobility information in a radio resource control reconfiguration message of the first base station.

In an implementable manner, the first indication information is set by the second base station, and is sent to the user equipment by using configuration information, related to a secondary cell group, in a radio resource control reconfiguration message of the first base station.

In an implementable manner, a second base station cell group failure notified by the user equipment is a failure in initially requesting to access the second base station or a failure in requesting to access the second base station.

In an implementable manner, the second base station cell group failure includes information that indicates timer expiry.

In an implementable manner, the first indication information further includes a preset second maximum quantity of times the user equipment sends the random access scrambling code to the second base station after the user equipment accesses the second base station; and when a quantity of times the user equipment sends the random access scrambling code in a process of requesting to access the second base station is greater than the second maximum quantity of times, the second maximum quantity of times is used by the first base station to receive a second base station cell group failure notified by the user equipment by using an upper layer of the user equipment.

In specific implementation, when a random access failure occurs subsequently, the UE notifies the upper layer of the UE that a problem occurs during randomly accessing the second base station, and the upper layer of the UE sends a second base station cell group failure notification to the first base station.

In an implementable manner, the first base station sends second indication information to the user equipment if the user equipment accesses the second base station, where the second indication information includes a second maximum quantity of times the user equipment sends the random access scrambling code to the second base station.

According to FIG. 9 of embodiments of the present invention, a time in which user equipment initiates a random access process or a quantity of times user equipment sends random access scrambling code can be limited by using a primary secondary cell, and limited content is sent to the user equipment. Therefore, a success rate of accessing the primary secondary cell by the user equipment is improved, and the user equipment can access the primary secondary cell faster. In addition, respective maximum quantities of times the user equipment initially initiates a random access process and continues to initiate a random access process after accessing the primary secondary cell are differentiated, so that efficiency of accessing the primary secondary cell by the user equipment can be improved.

Figure 10:
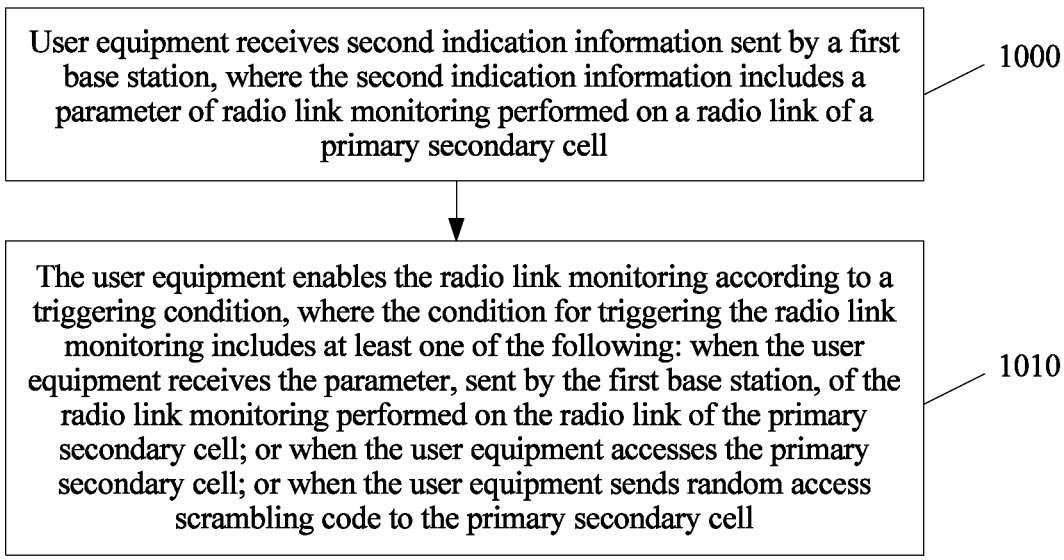
FIG. 10 is a schematic flowchart of an embodiment of a radio link monitoring method according to an embodiment of the present invention.

FIG. 10 is a schematic flowchart of an embodiment of a radio link monitoring method according to an embodiment of the present invention. A second base station involved in this embodiment of the present invention may be a primary secondary cell PSCell, and after UE accesses the PSCell, the UE performs radio link monitoring on a radio link of the PSCell in subsequent data transmission with the PSCell. In this embodiment of the present invention, a condition for triggering the UE to perform the radio link monitoring is described by using an example.

The embodiment of the radio link monitoring method shown in FIG. 10 may include the following steps.

Step 1000: User equipment receives second indication information sent by a first base station, where the second indication information includes a parameter of radio link monitoring performed on a radio link of a primary secondary cell.

Step 1010: The user equipment enables the radio link monitoring according to a triggering condition, where the condition for triggering the radio link monitoring includes at least one of the following: when the user equipment receives the parameter, sent by the first base station, of the radio link monitoring performed on the radio link of the primary secondary cell; or when the user equipment accesses the primary secondary cell; or when the user equipment sends random access scrambling code to the primary secondary cell.

In an implementable manner, the foregoing step 1010 may include: performing synchronized counting and/or unsynchronized counting according to the triggering condition; and starting an unsynchronization timer.

In an implementable manner, a condition for starting the unsynchronization timer includes: the triggering condition is met, and a value accumulated according to the unsynchronized counting is greater than or equal to a first preset value.

In specific implementation, the parameter of the radio link monitoring may be a parameter such as a synchronization counter, an unsynchronization counter, or a timing time. The parameter of the radio link monitoring may further include a synchronization threshold and an unsynchronization threshold. The synchronization threshold and the unsynchronization threshold may further be obtained inside the UE.

In specific implementation, for the condition 1, the radio link monitoring is enabled at a moment the UE receives the parameter of the radio link monitoring sent by the first base station; for the condition 2, the radio link monitoring is enabled when the UE successfully accesses the PSCell, and the UE performs the radio link monitoring by using a previously received parameter, sent by the first base station, of the radio link monitoring performed on the radio link of the PSCell; and for the condition 3, the radio link monitoring is enabled when the UE decides to access the PSCell by using a random access process. The triggering condition for enabling the radio link monitoring is clearly limited, which helps the UE implement the radio link monitoring, and improves efficiency of the radio link monitoring.

In an implementable manner, when the user equipment receives the parameter sent by the first base station, the primary secondary cell is a serving cell that is of the second base station and that has provided a service for the UE.

Optionally, because the second base station has several primary cells, in a moving process of the UE, a signal between the UE and an originally accessed primary cell weakens; in this case, the second base station may replace a current PSCell with another primary cell, and the UE continues to perform data transmission with the another primary cell; a parameter received by the UE in this case is a parameter of radio link monitoring performed on the another primary cell.

In an implementable manner, if a radio link failure occurs when the user equipment performs the radio link monitoring, the user equipment notifies the first base station that the user equipment encounters a second base station cell group failure.

In an implementable manner, the second indication information is set by the second base station, and is sent to the user equipment by using non-mobility information in a radio resource control reconfiguration message of the first base station.

In an implementable manner, the second indication information is set by the second base station, and is sent to the user equipment by using configuration information, related to a secondary cell group, in a radio resource control reconfiguration message of the first base station.

In an implementable manner, the user equipment obtains the second indication information from primary secondary cell adding information or dual connectivity establishment information sent by the first base station.

In specific implementation, for a radio link monitoring process initiated by the UE, reference is made to the embodiment of FIG. 6, and details are not described again in this embodiment.

In an implementable manner, a condition for the radio link failure to occur when the user equipment performs the radio link monitoring is unsynchronization timer expiry.

In an implementable manner, the user equipment accesses the primary secondary cell in any one of the following manners: a random access process initiated by the user equipment to the primary secondary cell is successfully completed; or the user equipment accesses the primary secondary cell within a preset maximum quantity of times of sending the random access scrambling code; or the user equipment accesses the primary secondary cell within a time period required for initially requesting to access the primary secondary cell, or when the user equipment begins to perform data transmission with the primary secondary cell.

According to FIG. 10 of embodiments of the present invention, a condition for triggering radio link monitoring can be specified after user equipment accesses a primary secondary cell, so that the UE can fully control a time for enabling the radio link monitoring, and an essential function of the radio link monitoring performed by the user equipment is shown.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), a random access memory (RAM), or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. An apparatus comprising:
  a memory storing a program; and
  at least one processor in communication with the memory, wherein the at least one processor is configured to execute the program to:
  receive first indication information and a second information from a first base station, wherein the first indication information comprises a time period for controlling initial access to a second base station and the second information comprises a maximum quantity of times;
  start a timer, wherein a timing length of the timer is the time period;
  send a first random access scrambling code to the second base station to request to access a primary secondary cell (PSCell) of the second base station; and
  perform the following:
    when the timer expires, notifying the first base station of a failure to access a cell group of the second base station, wherein expiration of the timer indicates the failure to access the cell group of the second base station by a user equipment; or
    when the user equipment accesses the PSCell before the timer expires, stopping the timer.

2. The apparatus according to claim 1, wherein:
  the first indication information is obtained from a radio resource control reconfiguration message of the first base station, and the first indication information is related to the cell group of the second base station.

3. The apparatus according to claim 1, wherein the at least one processor obtains the first indication information from adding information of the second base station or dual connectivity establishment information.

4. The apparatus according to claim 1, wherein the at least one processor is further configured to execute the program to:
  initiate another random access process after the user equipment accesses the PSCell, wherein the maximum quantity of times of the second information is a maximum quantity of times for sending a second random access scrambling code to the PScell for the another random access process.

5. The apparatus according to claim 4, wherein the at least one processor is further configured to execute the program to:
  notify the first base station that the user equipment fails to access the second base station when a quantity of times of sending the second random access scrambling code is greater than the maximum quantity of times in the another random access process.

6. The apparatus according to claim 1, wherein the at least one processor is configured to execute the program to notify the first base station of the failure to access the cell group of the second base station when the timer expires.

7. The apparatus according to claim 1, wherein the at least one processor is configured to execute the program to stop the timer when the user equipment accesses the PSCell before the timer expires.

8. The apparatus according to claim 1, the apparatus is the user equipment.

9. An access method performed in a user equipment, the method comprising:
  receiving first indication information and a second information from a first base station, wherein the first indication information comprises a time period for controlling initial access to a second base station and the second information comprises a maximum quantity of times;
  starting a timer, wherein a timing length of the timer is the time period;
  sending a first random access scrambling code to the second base station to request to access a primary secondary cell (PSCell) of the second base station; and
  performing the following:
    notifying the first base station of a failure to access a cell group of the second base station when the timer expires, wherein expiration of the timer indicates that the user equipment fails to access the PSCell; or
    stopping the timer when the user equipment accesses the PSCell before the timer expires.

10. The method according to claim 9, wherein the first indication information is obtained from a radio resource control reconfiguration message of the first base station, and the first indication information is related to the cell group of the second base station.

11. The method according to claim 9, wherein the user equipment obtains the first indication information from adding information of the second base station or dual connectivity establishment information.

12. The method according to claim 9, further comprising:
  initiating another random access process after the user equipment accesses the PSCell, wherein the maximum quantity of times of the second information is a maximum quantity of times for sending a second random access scrambling code to the PScell for the another random access process.

13. The method according to claim 12, further comprising:
notifying the first base station that the user equipment fails to request to access the second base station when a quantity of times of sending a second random access scrambling code is greater than the maximum quantity of times in the another random access process.

14. The method according to claim 9, further comprising notifying the first base station of the failure to access the cell group of the second base station when the timer expires.

15. The method according to claim 9, further comprising stopping the timer when the user equipment accesses the PSCell before the timer expires.

16. A non-transitory computer readable storage medium, comprising computer program codes which, when executed by at least one processor of a user equipment, causes the at least one processor to execute the steps of:
receiving first indication information and a second information from a first base station, wherein the first indication information comprises a time period for controlling initial access to a second base station and the second information comprises a maximum quantity of times;
starting a timer, wherein a timing length of the timer is the time period;
sending a first random access scrambling code to the second base station to request to access a primary secondary cell (PSCell) of the second base station; and
performing the following:
notifying the first base station of a failure to access a cell group of the second base station when the timer expires, wherein expiration of the timer indicates the user equipment fails to access the PSCell; or
stopping the timer when the user equipment accesses the PSCell before the timer expires.

17. The non-transitory computer readable storage medium according to claim 16, wherein the first indication information is obtained from a radio resource control reconfiguration message of the first base station, and the first indication information is related to the cell group of the second base station.

18. The non-transitory computer readable storage medium according to claim 16, wherein the computer program codes further cause the at least one processor to execute the steps of:
obtaining the first indication information from adding information of the second base station or dual connectivity establishment information.

19. The non-transitory computer readable storage medium according to claim 16, wherein the computer program codes further cause the at least one processor to execute the steps of:
initiating another random access process after the user equipment accesses the PSCell, wherein the maximum quantity of times the second information is a maximum quantity of times for sending a second random access scrambling code to the PScell for the another random access process.

20. The non-transitory computer readable storage medium according to claim 19, wherein the computer program codes further cause the at least one processor to execute the steps of:
notifying the first base station that the user equipment fails to access the second base station when a quantity of times of sending a second random access scrambling code is greater than the maximum quantity of times in the another random access process.

* * * * *